(12) United States Patent
Hung et al.

(10) Patent No.: US 10,037,199 B2
(45) Date of Patent: Jul. 31, 2018

(54) SECURE INTER-PROCESS COMMUNICATION AND VIRTUAL WORKSPACES ON A MOBILE DEVICE

(71) Applicant: VMware, Inc., Palo Alto, CA (US)

(72) Inventors: Perry Hung, Cambridge, MA (US);
Harvey Tuch, Cambridge, MA (US);
Craig F. Newell, Cambridge, MA (US);
Haim Tebeka, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 333 days.

(21) Appl. No.: 14/689,787

(22) Filed: Apr. 17, 2015

(65) Prior Publication Data

US 2015/0222637 A1 Aug. 6, 2015

Related U.S. Application Data

(63) Continuation of application No. 13/775,047, filed on Feb. 22, 2013, now Pat. No. 9,524,154.
(Continued)

(51) Int. Cl.
*G06F 3/00* (2006.01)
*G06F 9/44* (2018.01)
(Continued)

(52) U.S. Cl.
CPC .............. *G06F 8/54* (2013.01); *G06F 8/61* (2013.01); *G06F 9/44521* (2013.01); *G06F 9/54* (2013.01);
(Continued)

(58) Field of Classification Search
None
See application file for complete search history.

(56) References Cited

U.S. PATENT DOCUMENTS 6,026,235 A  2/2000  Shaughnessy
6,212,632 B1  4/2001  Surine et al.
(Continued)

OTHER PUBLICATIONS

Molecular Materials Informatics Inc, Interprocess communication amongst iOS apps, Aug. 2011, 7 pages.*
(Continued)

*Primary Examiner* — Diem Cao
(74) *Attorney, Agent, or Firm* — Thomas | Horstemeyer, LLP

(57) ABSTRACT

In an example, a method of creating a secured workspace in a mobile device includes installing an application management agent on the mobile device, wherein the application management agent is configured to communicate with a remote server to obtain a security policy. The method further includes installing a wrapped enterprise application to the mobile device. The wrapped enterprise application includes code injected therein that, when executed by the mobile device, causes the mobile device to intercept at least a portion of instructions being executed by the wrapped enterprise application and to interpose alternative instructions that comply with the security policy. The method further includes communicating among the wrapped enterprise application, the application management agent, and other wrapped enterprise applications through pasteboard and uniform resource locator (URL) handlers provided by an operating system of the mobile device.

19 Claims, 17 Drawing Sheets

Related U.S. Application Data

(60) Provisional application No. 61/692,857, filed on Aug. 24, 2012.

(51) Int. Cl.

| | | |
|---|---|---|
| *G06F 9/46* | (2006.01) | |
| *G06F 13/00* | (2006.01) | |
| *G06F 8/54* | (2018.01) | |
| *G06F 21/54* | (2013.01) | |
| *G06F 9/54* | (2006.01) | |
| *G06F 9/445* | (2018.01) | |
| *G06F 21/31* | (2013.01) | |
| *G06F 21/60* | (2013.01) | |
| *G06F 21/53* | (2013.01) | |
| *H04W 12/02* | (2009.01) | |
| *G06F 8/61* | (2018.01) | |
| *H04L 29/08* | (2006.01) | |
| *H04L 29/06* | (2006.01) | |
| *H04W 12/00* | (2009.01) | |

(52) U.S. Cl.
CPC .............. *G06F 21/31* (2013.01); *G06F 21/53* (2013.01); *G06F 21/54* (2013.01); *G06F 21/602* (2013.01); *G06F 21/604* (2013.01); *H04L 63/10* (2013.01); *H04L 63/20* (2013.01); *H04L 67/146* (2013.01); *H04W 12/02* (2013.01); *G06F 2221/2107* (2013.01); *G06F 2221/2143* (2013.01); *G06F 2221/2149* (2013.01); *H04L 63/0272* (2013.01); *H04W 12/00* (2013.01)

(56) References Cited

U.S. PATENT DOCUMENTS

| | | |
|---|---|---|
| 6,405,316 B1 | 6/2002 | Krishnan et al. |
| 6,463,583 B1 | 10/2002 | Hammond |
| 6,529,985 B1 | 3/2003 | Deianov et al. |
| 6,735,774 B1 | 5/2004 | Krishnaswamy |
| 6,959,441 B2 | 10/2005 | Moore |
| 7,111,323 B1 | 9/2006 | Bhatia et al. |
| 7,296,274 B2 | 11/2007 | Cohen et al. |
| 7,552,446 B1 | 6/2009 | Sosnovsky et al. |
| 7,565,665 B2 | 7/2009 | Forin et al. |
| 7,992,156 B1 | 8/2011 | Wang |
| 8,233,882 B2 | 7/2012 | Rogel |
| 2003/0126438 A1 | 7/2003 | Wheeler et al. |
| 2004/0006637 A1 | 1/2004 | Kuacharoen et al. |
| 2005/0108721 A1 | 5/2005 | Oshima et al. |
| 2005/0108733 A1 | 5/2005 | Bermudez et al. |
| 2005/0246705 A1 | 11/2005 | Etelson et al. |
| 2006/0161973 A1 | 7/2006 | Royer et al. |
| 2008/0034071 A1 | 2/2008 | Wilkinson et al. |
| 2008/0250400 A1 | 10/2008 | Vertes |
| 2008/0282266 A1 | 11/2008 | Kabanov |
| 2009/0049449 A1 | 2/2009 | Varadarajan |
| 2009/0164994 A1 | 6/2009 | Vasilevsky et al. |
| 2009/0227274 A1 | 9/2009 | Adler et al. |
| 2009/0249335 A1 | 10/2009 | Vasilevsky et al. |
| 2010/0024036 A1* | 1/2010 | Morozov ................. G06F 21/53 726/26 |
| 2010/0299719 A1* | 11/2010 | Burks ................. G06F 9/44505 726/3 |
| 2011/0219234 A1 | 9/2011 | Bogner |
| 2011/0252240 A1 | 10/2011 | Freedman et al. |
| 2011/0276987 A1 | 11/2011 | Pope et al. |
| 2012/0149668 A1* | 6/2012 | Greenhalgh ......... C12Q 1/6883 514/165 |
| 2013/0091543 A1 | 4/2013 | Wade et al. |
| 2013/0160072 A1 | 6/2013 | Reus et al. |
| 2013/0167250 A1 | 6/2013 | Balasubramanian |
| 2013/0239197 A1 | 9/2013 | Kato et al. |
| 2014/0007048 A1 | 1/2014 | Qureshi et al. |
| 2014/0032491 A1 | 1/2014 | Neerincx et al. |
| 2014/0036961 A1* | 2/2014 | Arnott .................. H04B 1/7143 375/133 |
| 2014/0059525 A1 | 2/2014 | Jawa et al. |
| 2014/0059573 A1 | 2/2014 | Jawa et al. |
| 2014/0059642 A1 | 2/2014 | Deasy et al. |
| 2014/0059703 A1 | 2/2014 | Hung et al. |
| 2014/0282869 A1 | 9/2014 | Dabbiere |
| 2014/0289511 A1 | 9/2014 | Tuch et al. |

OTHER PUBLICATIONS

David Schuetz, "The IOS MDM Protocol," Intrepidus Group, Inc.; Aug. 3, 2011, 29 pgs.

"Over-theAir Profile Delivery Concepts," http://developer.apple.com/library/ios/#documentation/networkinginternet/conceptual/iphoneotaconfiguration/OTASecurity/OTASecurity.html; Feb. 12, 2013, 6 pgs.

"Developer Forums: Retrieving Certificate from Keychain," p. 2, https://devforums.apple.com/thread/3336?start=25&start=0; Mar. 20, 2013, 5 pgs.

"Developer Forums: Retrieving Certificate from Keychain," p. 1, https://devforums.apple.com/message/11142#11142; Mar. 20, 2013, 13 pgs.

"Verify/Check to see if a Configuration Profile has been installed on iPhone," Careers 2.0 by stackoverflow, http://stackoverflow.com/questions/2195673/verify-check-to-see-if-a-configuration-profile-has-been-installed-on-iphone; Mar. 20, 2013, 2 pgs.

International Search Report and Written Opinion dated Dec. 2, 2013, Application No. PCT/US2013/056675, international filing date of Aug. 26, 2013, 8 pgs.

Apple Inc., "OS X ABI Mach-O File Format Reference", 2009, 42 Pages.

Sysmagazine, "Redirection of Functions in Mach-O libraries", Sysmagazine, 28 pages Apr. 2011.

Lozzo, Vincent, "Let Your Mach-O Fly", black Hat Briefings, Feb. 2009, 42 pages https://www.blachhat.com/presentations/bh-dc-09/Iozzo-Macho-on the fil.pdfLozzo, Vincent, "Let Your Mach-O Fly", black Hat Briefings, Feb. 2009, 42 pages https://www.blachhat.com/presentations/bh-dc-09/Iozzo-Macho-on the fil.pdf.

Mach-Developer Library—Mach-O Programming Topics, https://developer.apple.com/library/mac/documentation/developertools/conceptual/machotopics/1-articles_indirect_addressing.html, Feb. 2009.

Riley et al. "Multi-Aspect Profiling of Kernal Rootkit Behavior" ACM 2009 14 pages.

Office Action mailed Aug. 11, 2016 for U.S. Appl. No. 14/807,187.

Arto Kettula, Security Comparison of Mobile OSes, Helsinki University of Technology (2000).

Riley: article title, "Multi-Aspect Profiling of Kernel Rootkit Behavior", ACM 2009.

Mach-O: "OS X ABI Mach-O File Format Reference", Published at https://developer.apple.com/. . ./MachoRuntime/Reference/reference.html, Feb. 2009.

Notice of Allowance dated Feb. 27, 2018 for U.S. Appl. No. 15/590,582.

* cited by examiner

SECURE INTER-PROCESS COMMUNICATION AND VIRTUAL WORKSPACES ON A MOBILE DEVICE

CROSS-REFERENCE TO RELATED APPLICATIONS

This application is a continuation of U.S. patent application Ser. No. 13/775,047, filed Feb. 22, 2013, which claims priority to U.S. Provisional Patent Application 61/692,857, filed Aug. 24, 2012, both of which are incorporated by reference herein.

BACKGROUND

Over the past decade, the mobile device has evolved from a voice-centric device into a mobile personal computer. No longer just a device for voice communications, the mobile device has become a multitasking tool, useful for activities such as emailing and web browsing. The current trends for mobile devices are toward the mimicking of desktop functionality. As a result, mobile devices are becoming enterprise endpoints with rich applications and core enterprise connectivity. Because an enterprise may need to specifically provision a mobile device for accessing restricted data, an employee may either have to sacrifice a personal device for dedicated enterprise use or carry two devices, one personal and one for enterprise use, to work.

From an end-user perspective, it is desirable to consolidate the personal mobile device with the enterprise device. Virtualization offers an opportunity to provide a convenient solution by preserving isolation of environments without requiring a second physical enterprise device. Supporting a personal environment and a work environment through virtualization on a personal mobile device represents an attractive alternative to existing solutions involving multiple physical mobile devices. The rapid pace of hardware advances in mobile devices over the past several years has led to a class of mobile devices with resources capable of supporting multiple environments (e.g., one or more virtual phones) through virtualization.

However, given the current particular complexities of the mobile environment from technical, infrastructure, and business perspectives, providing sufficient virtualization capabilities on mobile devices remains challenging. For example, mobile service carriers typically do not give enterprises or end users full access to its hardware resources, for security or commercial reasons. In addition, not all mobile-device operating systems are virtualization-friendly. They may not provide sufficient privileged access to the system resources and impose stringent restrictions on the applications. For example, certain operating systems may not allow (or provide limited ability for) more than one process to execute at a time, and may not provide any inter-process call mechanism.

Furthermore, applications executing in operating systems with such restrictions may not be able to load customized system functions or otherwise take control of the operating system's system calls. Without control over the system calls, it can be difficult to implement and enforce enterprise policy on mobile devices used by an enterprise's employees. Hence, it remains a challenge to unify a user's work-related enterprise functionalities and his personal-use functionalities on the same mobile device.

SUMMARY

Secure inter-process communication and virtual workspaces on a mobile device are described. In an embodiment, a method of creating a secured workspace in a mobile device includes installing an application management agent on the mobile device, wherein the application management agent is configured to communicate with a remote server to obtain a security policy. The method further includes installing a wrapped enterprise application on the mobile device. The wrapped enterprise application includes code injected therein that, when executed by the mobile device, causes the mobile device to intercept at least a portion of instructions being executed by the wrapped enterprise application and to interpose alternative instructions that comply with the security policy. The method further includes communicating among the wrapped enterprise application, the application management agent, and other wrapped enterprise applications through pasteboard and uniform resource locator (URL) handlers provided by an operating system of the mobile device.

Further embodiments include a non-transitory computer-readable storage medium comprising instructions that cause a computer system to carry out the above method above, as well as a computer system configured to carry out the above method.

BRIEF DESCRIPTION OF THE FIGURES

In the figures, like reference numerals refer to the same figure elements.

DETAILED DESCRIPTION

Figure 1:
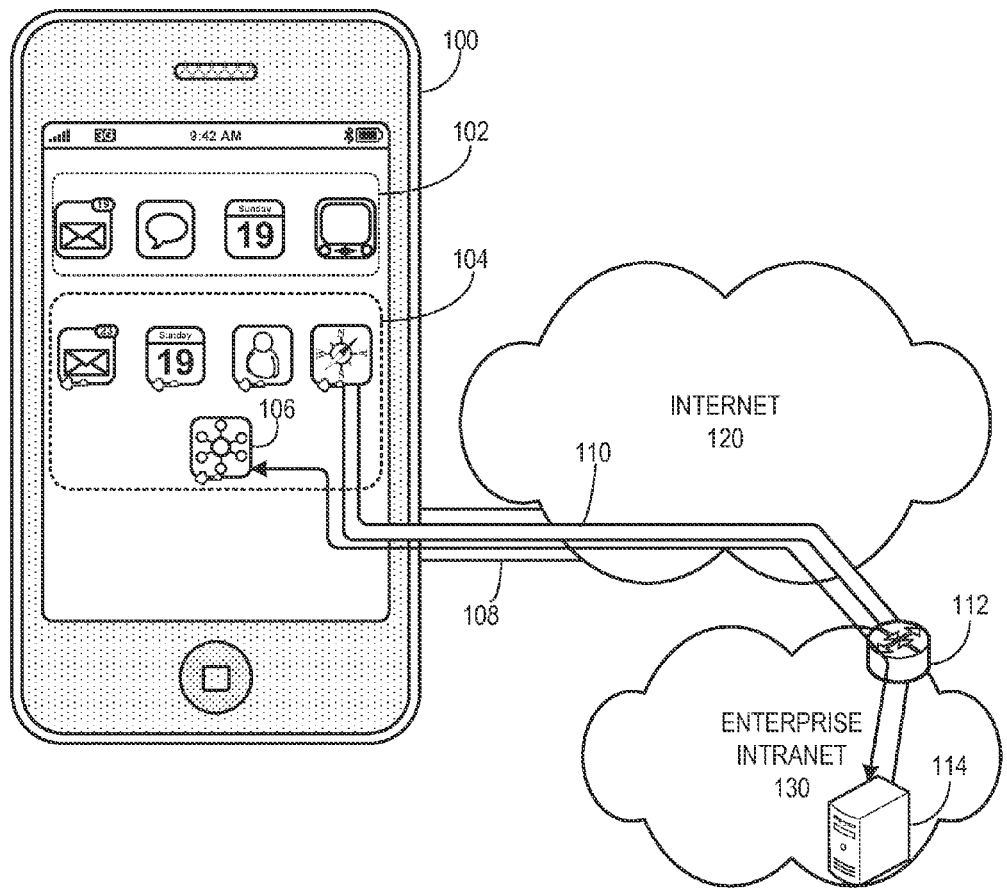
FIG. 1 illustrates an exemplary isolated workspace on a mobile phone, in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the system described herein solve the problem of replacing or interposing certain system library calls with customized system calls in a Mach-O file is solved by i) modifying the Mach-O file offline to cause the operating system loader to load a hook and injection manager module before loading any other modules with dependencies, and ii) upon application launch, replacing all function pointer values for interposed system library calls, both in the application binary file and dependent library modules. By changing the function pointer for a conventional system library call before execution, the hook and injection manager can replace the conventional system library call with a customized function call. Further, although executable code within library modules may also make system library calls, the techniques disclosed herein also change the function pointers for library modules before the code can make any such system call. Thus, all such system calls are preemptively redirected to customized functions, regardless of whether the system call is made from within the application binary or from within a library module.

Note that a shared library is a collection of modules, and a module is the smallest unit of machine code and data that can be linked independently of other units of code. An operating system's dynamic loader loads shared libraries when an application is launched. From a high-level perspective, embodiments described herein allow enterprise applications to execute alongside personal applications on the same mobile device without running a conventional virtual machine. These enterprise applications can reside within a secure, exclusive "virtual workspace" that is isolated from other regular applications. In particular, a wrapping utility tool can modify a generic application, which results in a "wrapped" application with substituted system library calls. These substitute system calls, referred to as "wrapper," become part of the application and serve as a policy enforcement mechanism. For example, with a wrapper, certain enterprise applications may communicate with an enterprise intranet via a virtual private network (VPN) tunnel, and may be precluded from using the mobile device's regular, unencrypted data connectivity. The policy enforcement component, or wrapper, of each enterprise application running in the workspace can also require that all the files associated with the enterprise applications are encrypted.

The wrapping utility tool inserts the hook and injection manager into the application's object file that, upon launching the application, the operating system loader loads the hooking and injection manager before any module with dependencies. After the dynamic loader loads the application binary file and dependent library modules, the hook and injection manager dynamically loads an interposition library. An initialization function in the interposition library then scans the rest of the loaded code and modifies function pointers for certain system calls so that the function pointers point to customized system functions. The hook and injection manager substitutes a conventional system call with a customized system call by changing the value of the function pointer in an import table. The hook and injection manager modifies all function pointers, whether found in import tables belonging to the application binary or belonging to a library module, thereby taking control of system calls and enforcing the enterprise policy.

When the application binary is initially loaded at runtime, the hook and injection manager searches for a symbol representing the system call in a symbol table. After finding the symbol table entry, the hook and injection manager obtains a symbol table index value. The hook and injection manager uses the symbol table index value to search through an indirect table for an import table index value, and uses the import table index value to locate the proper table entry in the import table. The hook and injection manager then overwrites the address for the conventional system call in the import table with the address for the customized system call.

The following disclosure uses enterprise applications and Mach-O object files as examples. However, embodiments of the present application are applicable in any environment where a set of applications (which may or may not be enterprise applications) can benefit from a secure, isolated execution environment. Furthermore, the term "mobile device" can refer to, but is not limited to, mobile phones, personal digital assistant (PDA) devices, tablet computers, and portable computers.

Isolated Workspace

As previously discussed, embodiments described herein facilitate implementation of a "virtual workspace" to provide isolation between a personal and enterprise environment in a mobile device. Such a workspace provides a secure and exclusive environment in which a collection of enterprise applications execute. For example, an enterprise's IT department may offer certain enterprise applications to enable an employee to access the enterprise's confidential or restricted information using the employee's personal mobile device (e.g., by accessing a remote server controlled by the enterprise or locally storing such information in a secure manner on the mobile device). Examples of such applications include an email application, phone book, document management program, calendar, specialized web browser, and chat/conferencing application. The workplace provides an isolated environment for these enterprise applications to run and prevents unauthorized applications on the same mobile device from accessing the data used by the enterprise applications.

To facilitate this isolated workspace, certain embodiments of enterprise applications satisfy two conditions: (1) they use an exclusive, secure network connection (e.g., VPN, etc.) to access resources at the enterprise (e.g., data, application servers, etc.) and that is not accessible to other applications on the same mobile device; and (2) they can share certain local resources (such as file storage and memory) among themselves, but these resources are not accessible to other applications.

As described below, to satisfy these conditions, an enterprise prepares enterprise applications for installation on a mobile device by performing an offline wrapping process on them that replaces or interposes on certain system library calls (typically related with I/O) with customized calls by "injecting" into the enterprise application, for example, dynamically-linked libraries including these customized calls (i.e., these libraries referred to as a "wrapper" around the original enterprise application) or pre-linking with static libraries containing these customized calls. For example, in one embodiment, the enterprise utilizes an offline utility tool to modify the binary executable (e.g., Mach-O file in an Apple iOS embodiment, etc.) of an enterprise application in order to cause the enterprise application to load one or more specified dynamically linked libraries (e.g., .dylib file in an Apple iOS embodiment) when the enterprise application is launched on the mobile device.

Such dynamically linked libraries are then included as part of the enterprise application's archive file (e.g., .ipa file in an Apple iOS embodiment). The customized calls included in the dynamically linked libraries can ensure that the application's I/O functions (e.g., network communication and file access) comply with enterprise policies. In addition, a special local application installed on the user's mobile device, referred to herein as an "application management agent," maintains and updates the enterprise policies locally on the mobile device (e.g., by communicating with a remote management server at the enterprise) and, in certain embodiments, also provides an enterprise application catalog for the end user to select, download and install enterprise applications into the workspace of the mobile device.

Note that although the present disclosure uses "workspace" as a shorthand for this isolated and secure execution environment for enterprise applications, "workspace" is only a logical abstraction that refers to a collection of enterprise applications. In actual implementations, there may or may not be an actual displayed workspace on a graphic user interface (such as a folder). In addition, the present disclosure uses the phrase "accessing a workspace" in a generic sense and does not necessarily require a user to access a folder. A user can access a workspace by merely accessing one of the enterprise applications that belongs to the workspace.

FIG. 1 illustrates an exemplary isolated workspace on a mobile device, in accordance with an embodiment. In this example, a mobile device 100 displays its applications as icons on a touch screen. A group of regular (e.g., personal) applications 102 can include, for example, an email program, a text messaging program, a calendar program, or an online video viewing program. Mobile device 100 also displays a set of enterprise applications (denoted by a small key symbol on the lower left corner of each icon) that operate within a workspace 104.

It should be recognized that the display of FIG. 1 is merely exemplary and that in alternative embodiments, visualization of workspace 104 on the screen of mobile device 100 may differ. For example, in one alternative embodiment, icons representing enterprise application operating within workspace 104 may be intermingled with icons for regular or personal applications 102. In other alternative embodiments, icons representing enterprise applications operating within workspace 104 may be separated from icons for regular or personal applications, for example, through the use of a finger swipe action that takes the user from a screen displaying only personal or regular application 102 to a separate screen displaying only enterprise applications in workspace 104. Examples of enterprise applications in workspace 104 include, for example, an enterprise email program, an enterprise calendar program, an enterprise directory, or an enterprise browser.

Also included in workspace 104 is an application management agent 106 (as previously discussed), which serves as a local repository of security and access-control policies for all the enterprise applications. For example, application management agent 106 may periodically communicate (e.g., on behalf of or at the request of running enterprise applications) with a remote application management server 114 at the enterprise to obtain up-to-date security and access control policies. It should be recognized that although the embodiment of FIG. 1 depicts an icon on application management agent 106 on the screen of mobile device 100 as an application that is not required to run during the execution of enterprise applications, alternative embodiments may implement application management agent 106 as a service running on mobile device 100 rather than an icon-based application that is launched by the user by selecting an icon on the screen of mobile device 100 (or by other enterprise applications using the mobile operating system's URL handler functionality).

In addition to voice services, as depicted in the embodiment of FIG. 1, mobile device 100 maintains some type of data connectivity 108 to a public network, such as Internet 120. Data connectivity 108 can be a cellular data communication channel or a wireless network connection (WiFi). To facilitate secure communication between enterprise applications operating within workspace 104 and an enterprise intranet 130, an enterprise application may maintain a VPN tunnel 110 to an enterprise gateway router 112. VPN tunnel 110 provides a secure communication channel between an enterprise application and enterprise intranet 130. In one embodiment, as further discussed below, the customized system calls included with an enterprise application (e.g., within the wrapper) are responsible for maintaining a VPN tunnel (such as VPN tunnel 110) and ensuring that all network communication is routed through the VPN tunnel.

Furthermore, since VPN tunnel 110 is specific to a particular enterprise application, VPN tunnel 110 is not available to other applications outside workspace 104. This exclusive availability of VPN tunnel 110 to a particular enterprise application ensures that all data communication from and to the enterprise application operating within workspace 104 is secure and encrypted. In addition, since the VPN tunnels are enterprise application-specific, gateway router 112 can obtain application-specific access history, which in turn enhances the security of intranet 130. Note that although VPN tunnel 110 is established within data connectivity 108 which is available to all applications on mobile device 100, the content carried in VPN tunnel 110 remains confidential and is only accessible to the enterprise application responsible for VPN tunnel 110.

In certain embodiments, application management agent 106 can run on an as-needed basis. That is, application management agent 106 runs only when an enterprise application calls it (e.g., to exchange authentication credentials, cryptographic keys and other data relating to working with the secured workspace, etc.) or when a user launches it. In other embodiments, application management agent 106 can remain running as long as there is at least one enterprise application running (however, this option might not be available in operating systems that do not allow or only provide limited concurrently running processes). Optionally, application management agent 106 can start automatically as a service as part of the boot-up sequence of mobile device 100. Applicant management agent 106 is responsible for maintaining and updating enterprise policies, such as security requirements and access control. In addition, application management agent 106 can, from time to time or on an as-needed basis, communicate with application management server 114, which in one embodiment can reside in enterprise intranet 130. Application management server 114 can distribute updates to the enterprise policies and remotely manage the enterprise applications via application management agent 106.

Managing Applications within Workspace

In certain embodiments, enterprise applications within workspace 104 comply with the security and isolation requirements and enterprise policies maintained by application management agent 106 and are either (1) applications specifically developed (e.g., using a provided SDK and APIs) to enforce enterprise policies (sometimes referred to as "containerized applications") and (2) conventional, generic applications that have been "wrapped" (as opposed to having been specifically designed) to enforce enterprise policies (sometimes referred to as "wrapped applications"). Containerized applications may include applications developed in-house by the enterprise specifically to be used in the workspace, such as an expense report generating application for the enterprise's sales department or a financial forecasting application for the enterprise's finance team. Wrapped application can be generic applications developed either by the enterprise or third-party vendors, such as email programs, web browsers, and document viewers that have been developed for general use. As previously discussed, in order to create wrapped applications, an enterprise or a developer of an enterprise application can utilize a wrapping utility program or tool to wrap generic applications with a policy-enforcement mechanism, which, in one embodiment, involves injecting references to dynamically linked libraries (e.g., interposition library 203) as described in more detail below in conjunction with FIG. 2, into the application's binary code that replace conventional system calls. These dynamically linked libraries replace certain system calls used by the enterprise application, forcing the enterprise application to comply with enterprise policies. For example, for communication purposes, the wrapper can replace a conventional system call to generate a TCP/IP socket with a customized call that generates and returns a socket for a VPN tunnel This way, all data communications initiated by the enterprise application go through the VPN tunnel Furthermore, the wrapper of the enterprise application may also communicate with the application management agent 106 to obtain the most up-to-date version of the enterprise's policies. In certain embodiments, such policies may have an expiration, thereby causing an enterprise application to periodically update its own copy of the enterprise policy when its own copy has expired.

Figure 2:
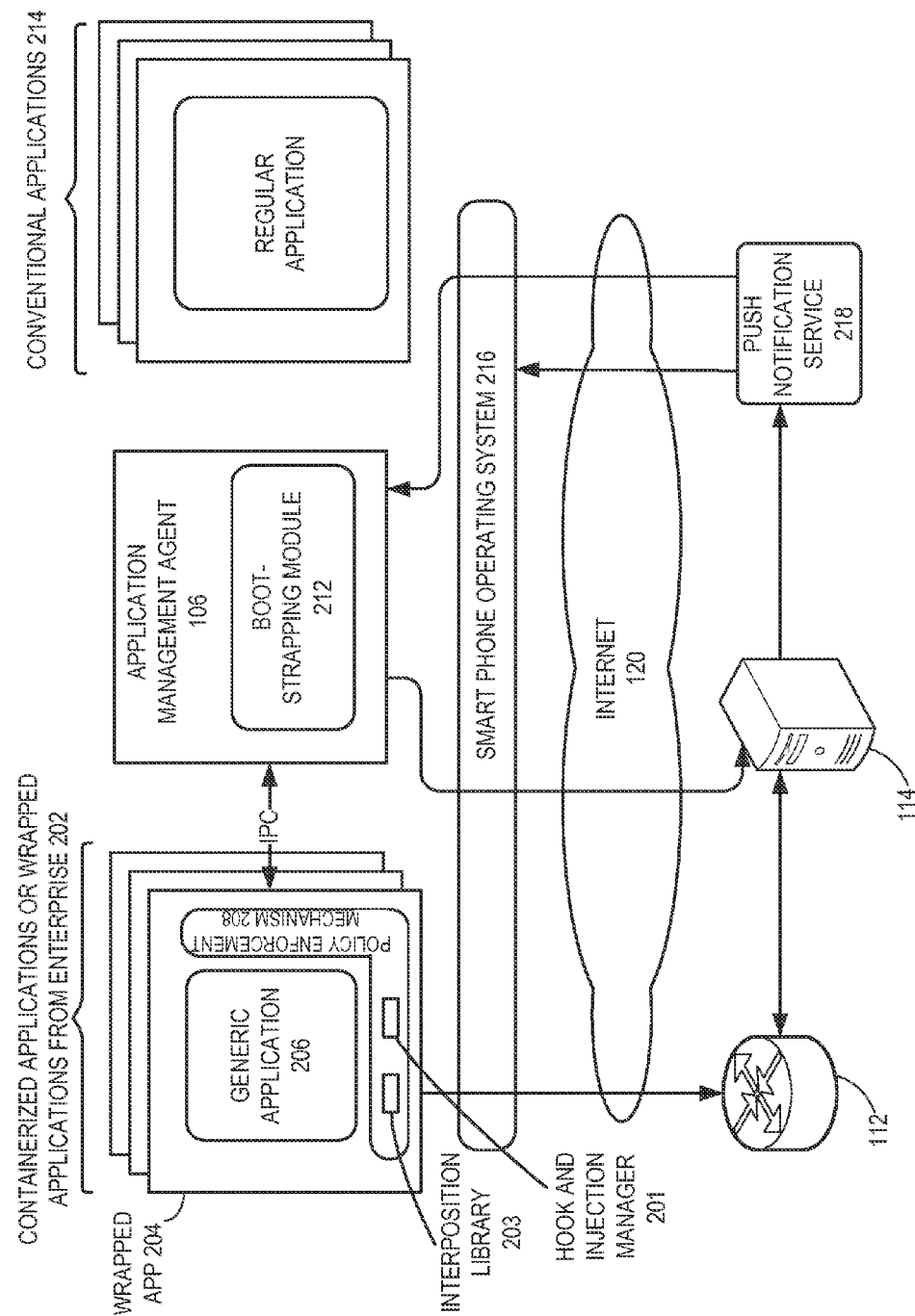
FIG. 2 illustrates an exemplary architecture of a mobile phone that facilitates isolated workspace, in accordance with an embodiment.

FIG. 2 illustrates an exemplary architecture of mobile device 100 that facilitates isolated workspace 104, in accordance with an embodiment. In the embodiment of FIG. 2, the operating system 216 of mobile device 100 supports a set of conventional applications 214 and a set of enterprise applications 202. A wrapped application 204 includes a generic application 206 wrapped with a policy enforcement mechanism 208 (which in one embodiment manifests as a wrapper, as previously discussed, comprising a set of injected dynamic libraries (e.g., an interposition library 203 dynamically loaded by a hook and injection manager 201) that replace conventional system calls of generic application 206. Policy enforcement mechanism 208 communicates enterprise policies to wrapped application 204 using, for example, an inter-process communication (IPC) mechanism to obtain such policies from application management agent 106. The interposed system library calls may, for example, communicate with application management agent 106 in order to obtain a security policy governing a user's ability to access the enterprise applications. In a mobile operating system that does not support or provides limited support for concurrently running processes such that traditional IPC is available, the mechanism for wrapped application 204 to communicate with application management agent 106 (as well as other wrapped enterprise applications) may be implemented as a secure and encrypted pasteboard (e.g., utilizing a pasteboard functionality provided by the underlying mobile operating system, such as UIPasteboard in Apple's iOS) that serves as a message-drop-box for two or more communicating applications in workspace 104.

During operation, wrapped enterprise application 204 can communicate with the enterprise network via VPN tunnel 110 terminated at gateway router 112. In one embodiment, policy enforcement mechanism 208 ensures that the network communication for generic application 206 goes through a socket corresponding to VPN tunnel 110. As a result, for example, an web browser application within workspace 104 can browse the enterprise intranet content via the VPN tunnel, and an document viewer within workspace 104 can allow the user to view documents stored on the enterprise's intranet servers. Furthermore, application management agent 106 can communicate with application management server 114, for example, residing at the enterprise, to synchronize its local copy of the enterprise's policies with the most up-to-date version of the enterprise policies. In one embodiment, application management server 114 may push application or policy related update information to application management agent 106 via a push notification service 218, such as, for example, the Apple Push Notification Service (APNS).

Embodiments of application management agent 106 include bootstrapping functionality 212, which performs a series of operations upon an initial installation and launch of application management agent 106 (e.g., which, in certain embodiments, may be downloaded by the user of the mobile device from a public application store such as the Apple App Store) in order to enable enterprise applications to operating within workspace 104. Such operations performed by bootstrapping module 212 can, for example, include authenticating the user to enterprise's remote application management server 114 (e.g., by request the user's corporate based username and password, etc.), requesting the user to create authentication credentials (e.g., password, PIN, etc.) to access workspace 104, generating cryptographic elements (e.g., keys, randomized names, etc.) that can be used and shared with enterprise applications to authenticate enterprise applications to application management agent 106 and secure communications among the enterprise applications and application agent 106 (e.g., by encrypting communications to a pasteboard, etc.), and obtaining an initial version of the enterprise's policies from application management server 114.

Figure 3:
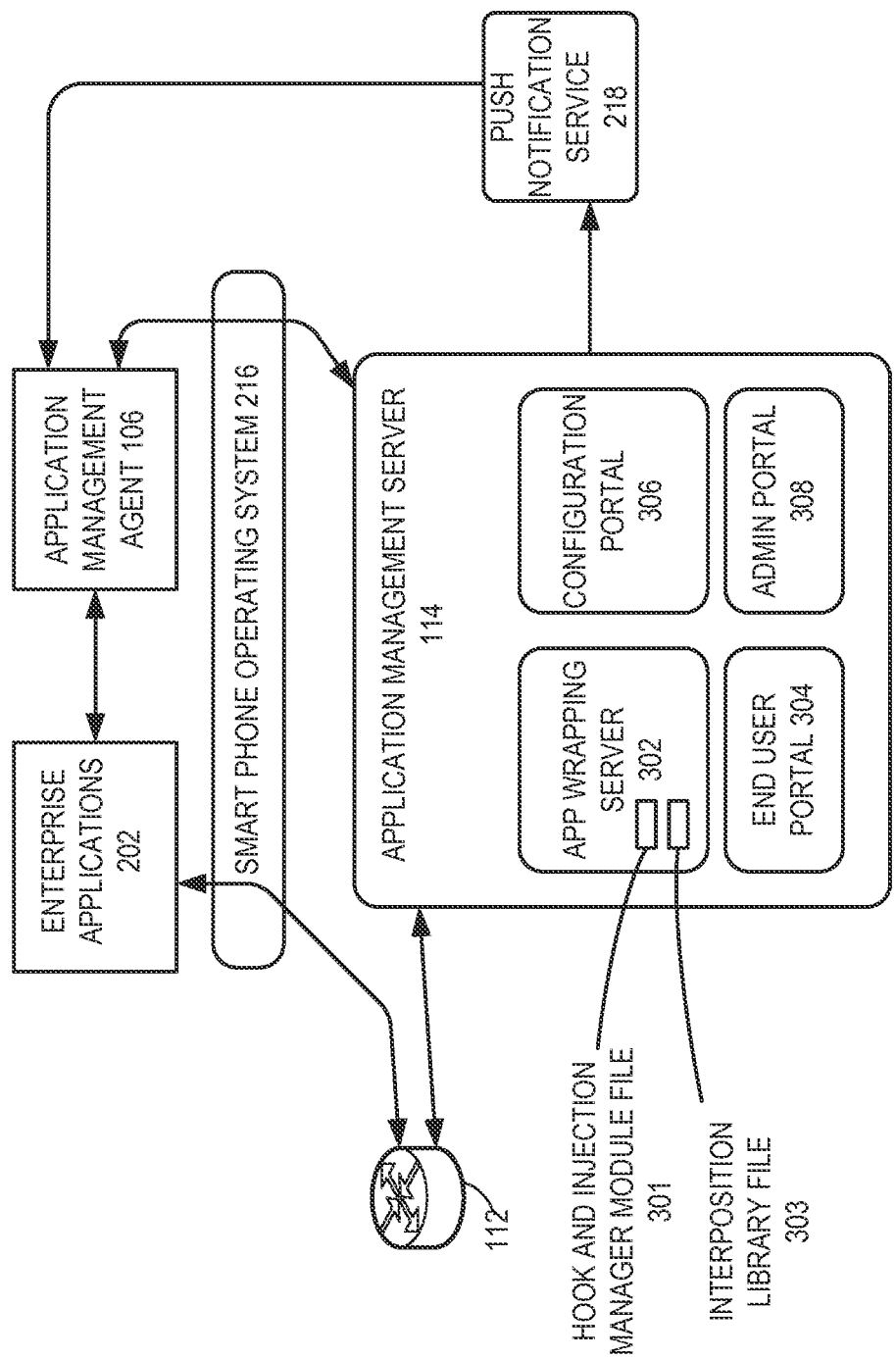
FIG. 3 illustrates an exemplary application management server that facilitates isolated workspace, in accordance with an embodiment.

FIG. 3 illustrates an exemplary application management server that facilitates isolated workspace 104, in accordance with an embodiment. In the embodiment of FIG. 3, application management server 114 includes an application wrapping server 302, an end user portal 304, a configuration portal 306, and an administrator portal 308.

Application wrapping server 302 allows the enterprise IT department to wrap any third-party application and turn the third-party application into an enterprise-specific application, which in turn can be listed in application catalogue 210 for the user to install. Details regarding modifying an application during the process of wrapping a third-party application are discussed with reference to FIG. 5, which includes adding a hook and injection manager module file 301 and an interposition library file 303 to an application archive (e.g., an .ipa file) during the wrapping process. The interposition library file 303 may include code that forms part of the policy enforcement mechanism 208. End user portal 304 allows an end user to log into application management server 114 using any network connection and manage the enterprise applications without using his smart phone. Configuration portal 305 allows an enterprise IT personnel to configure a particular user's enterprise applications, such as setting access control levels and customizing user policies. Administrator portal 308 provides an interface that allows a system administrator to configure application management server 114.

During operation, application management server 114 can communicate with enterprise applications 202 via VPN gateway router 112. Optionally, application management agent 106 may communicate with application management server 114 via a regular data connection (i.e., not via the VPN tunnel). Application management agent 106 can also use this data connection to set up the initial VPN tunnel Application management server 114 can also provide various notifications to push notification service 218, which in turn pushes these notifications to application management agent 106.

Application Wrapping

On the application wrapping server 302, the wrapping utility tool wraps generic applications to facilitate implementation of a policy-enforcement mechanism. In one embodiment, the wrapping involves injecting references to hook and injection manager 201 and an interposition library 203 into the application's binary code that, during runtime, replaces conventional system calls. The wrapping utility tool initially receives an application binary stored in an application archive file (e.g., .ipa file). The wrapping utility tool decompresses the application archive file to extract the application binary (e.g. a Mach-O object file). (The application archive file may also include other resource files, such as an application image file and application metadata file). The wrapping utility tool may modify the application binary, and add the hook and injection manager module file and an interposition library file to the application archive. Note that the interposition library 203 can be a dynamic link library (a binary file). In some implementations, the interposition library 203 is dynamically loaded at run time by the hook and injection manager module, and does not depend on any other library. The wrapping utility tool then compresses the archive and may also sign the archive. After modification, an administrator can deploy the application throughout the enterprise. When a client device receives the application, the client device unzips and installs the application file, and then executes the application.

Figure 4A:
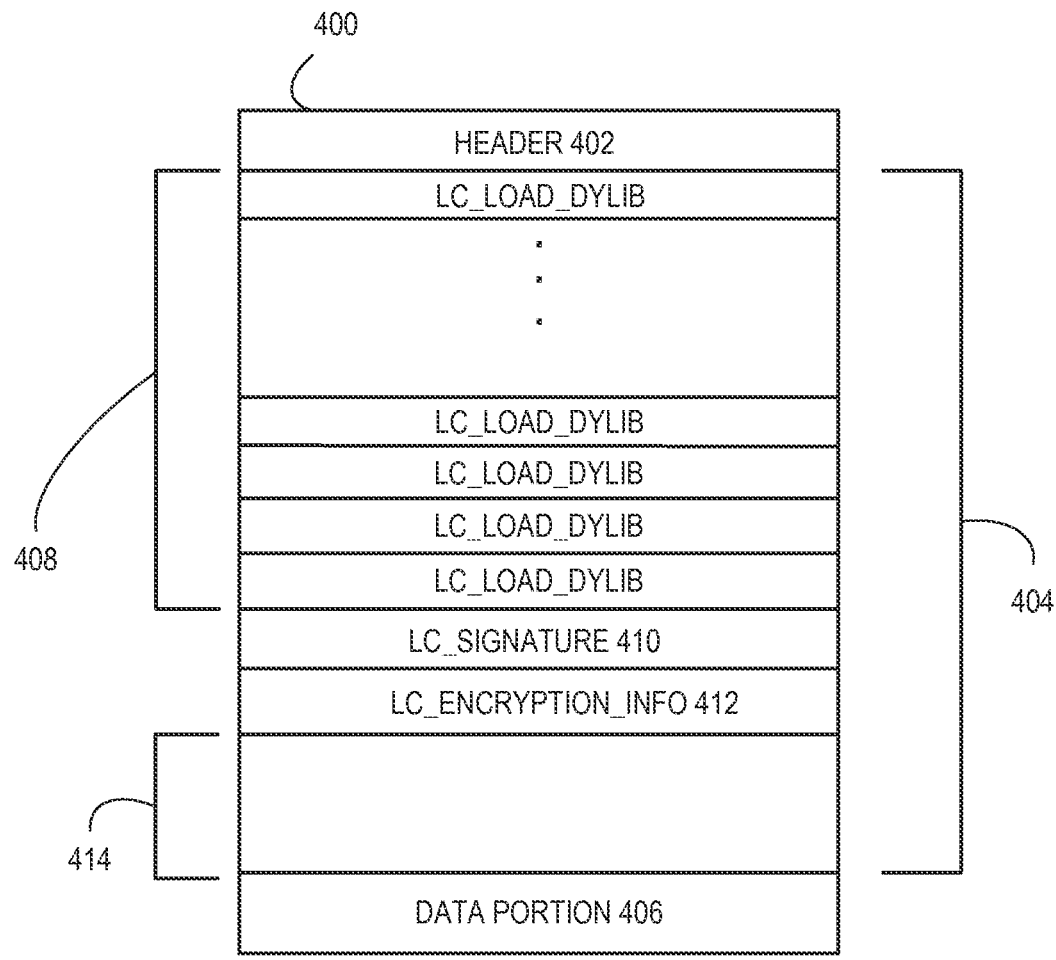
FIG. 4A illustrates an exemplary application object file, according to an embodiment.
Figure 4B:
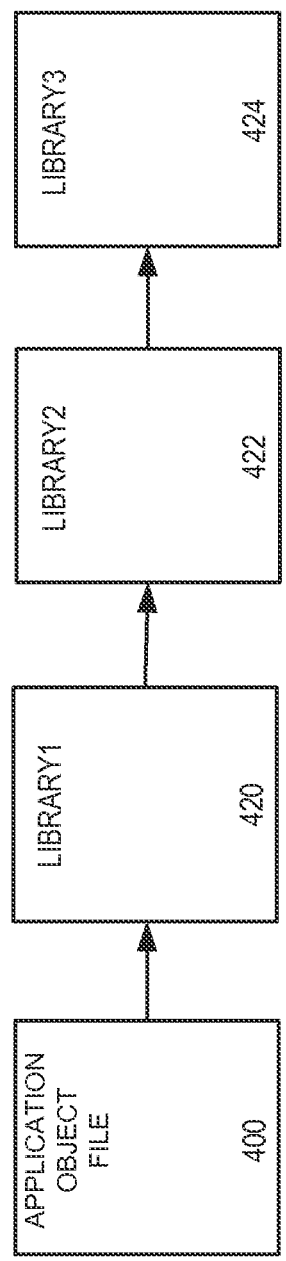
FIG. 4B illustrates a chain of module dependencies, in accordance with an embodiment.
Figure 5:
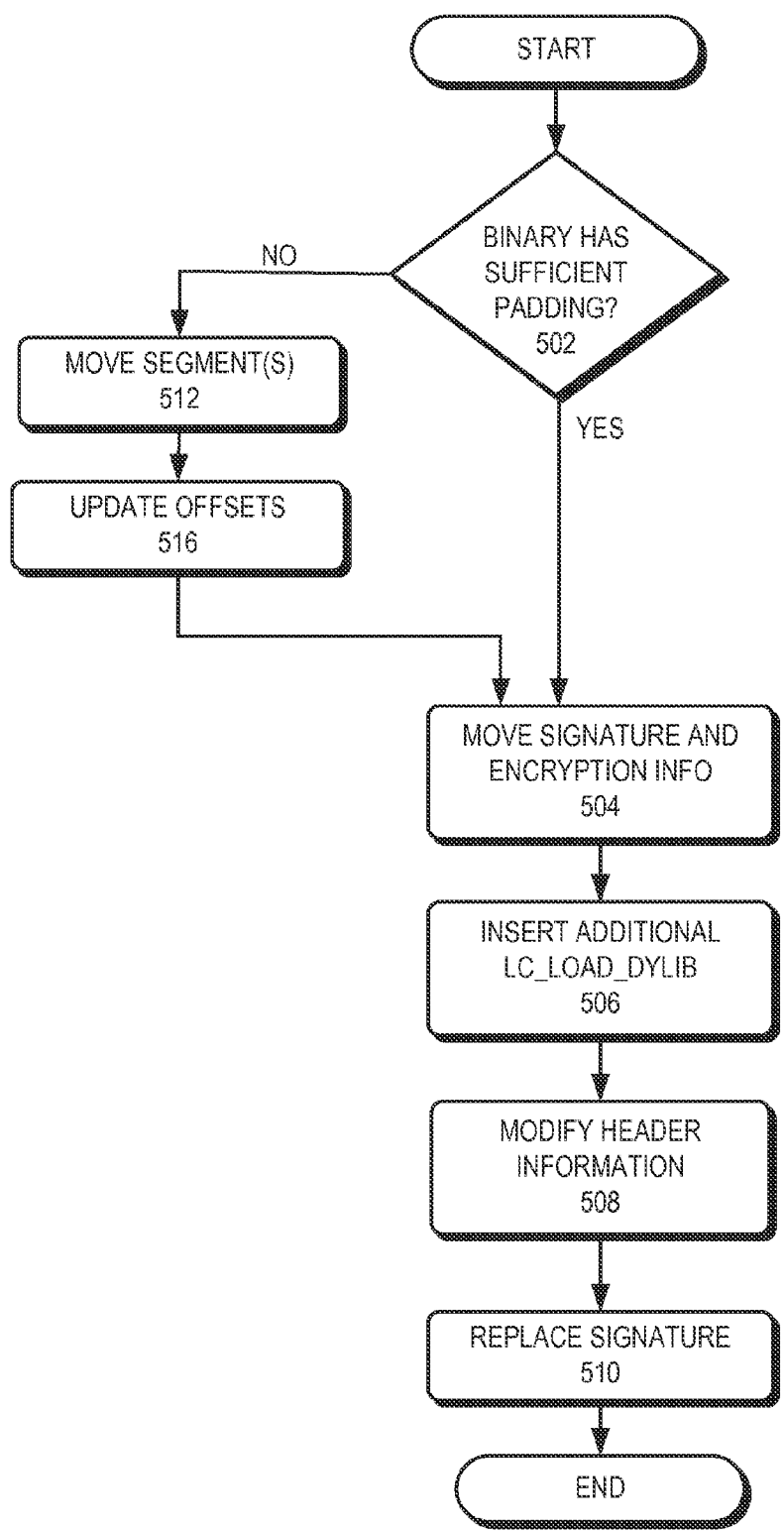
FIG. 5 illustrates a process for adding a hook and injection manager module to an application object file as a dependency, according to an embodiment.
Figure 6A:
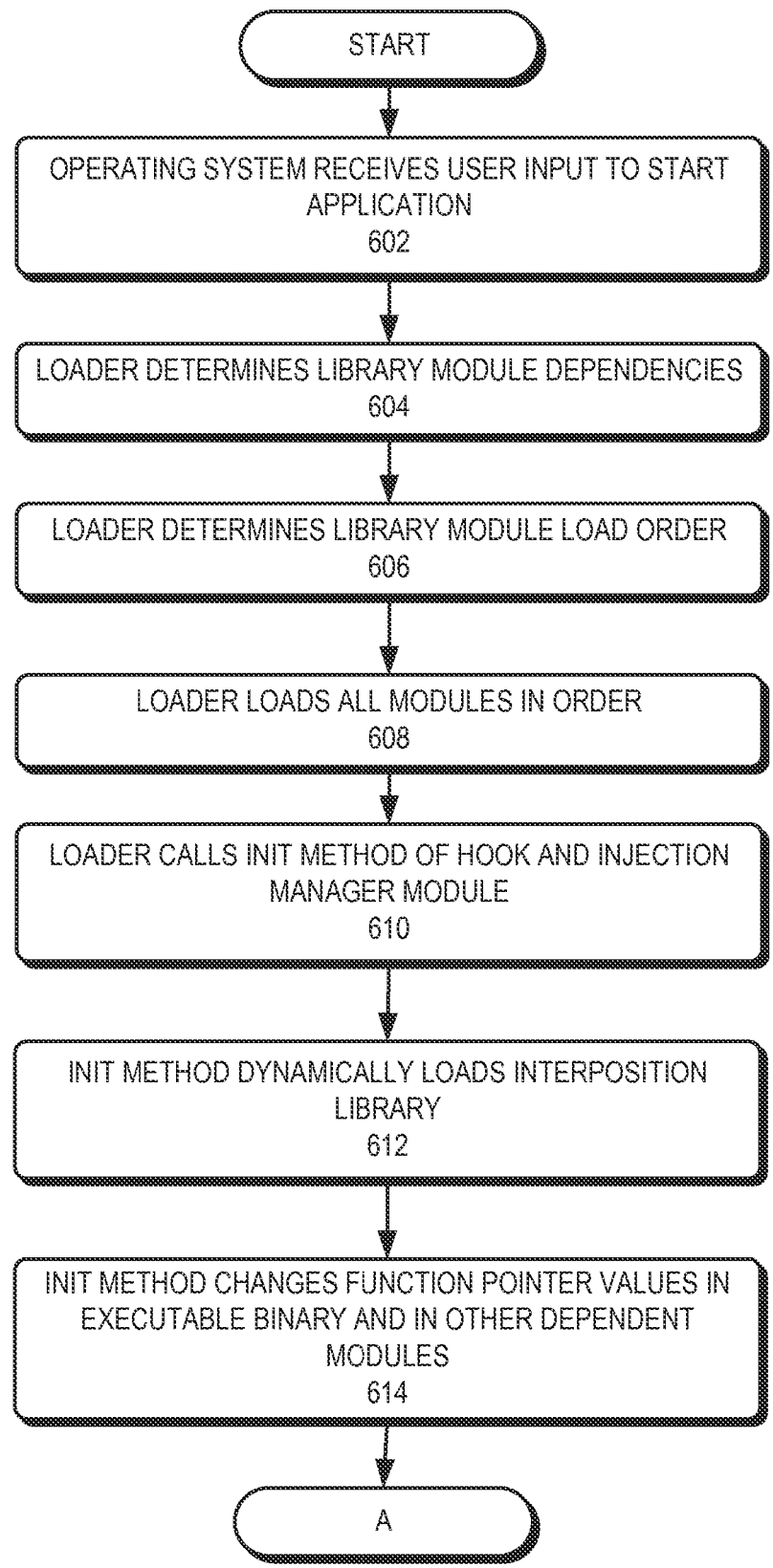
FIG. 6A and FIG. 6B together present a flowchart illustrating the process of launching an application with a hook and injection manager module, in accordance with an embodiment.
Figure 6B:
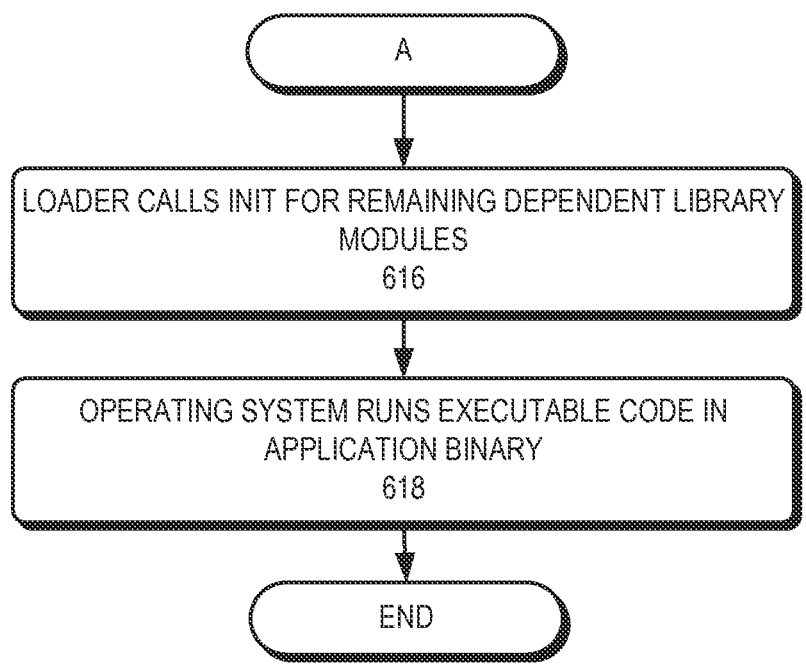
Figure 7A:
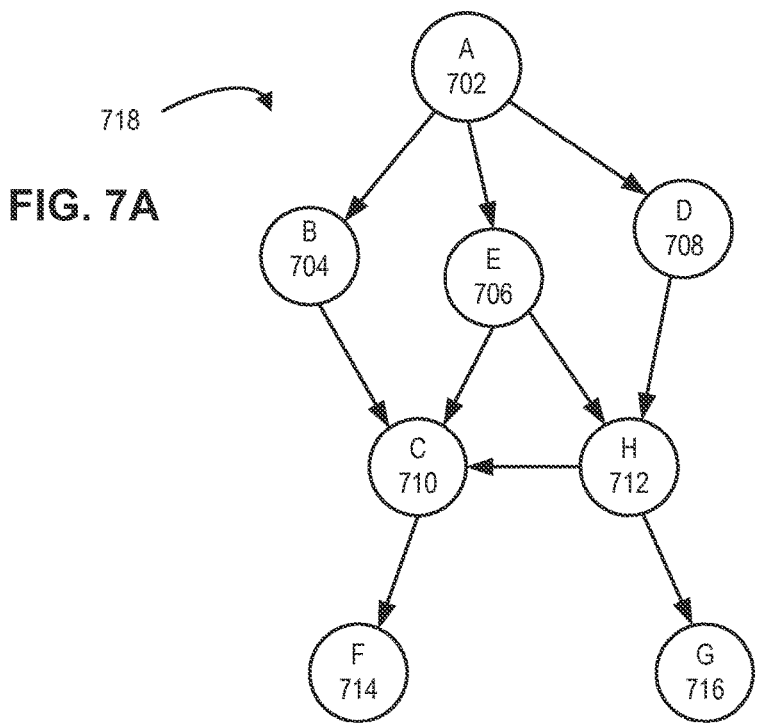
FIG. 7A and FIG. 7B illustrate an exemplary load order for module dependencies, in accordance with an embodiment.
Figure 7B:
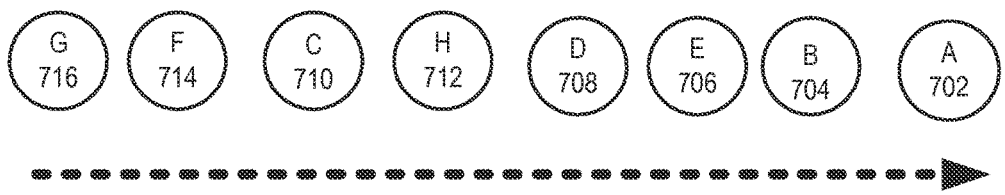
Figure 8:
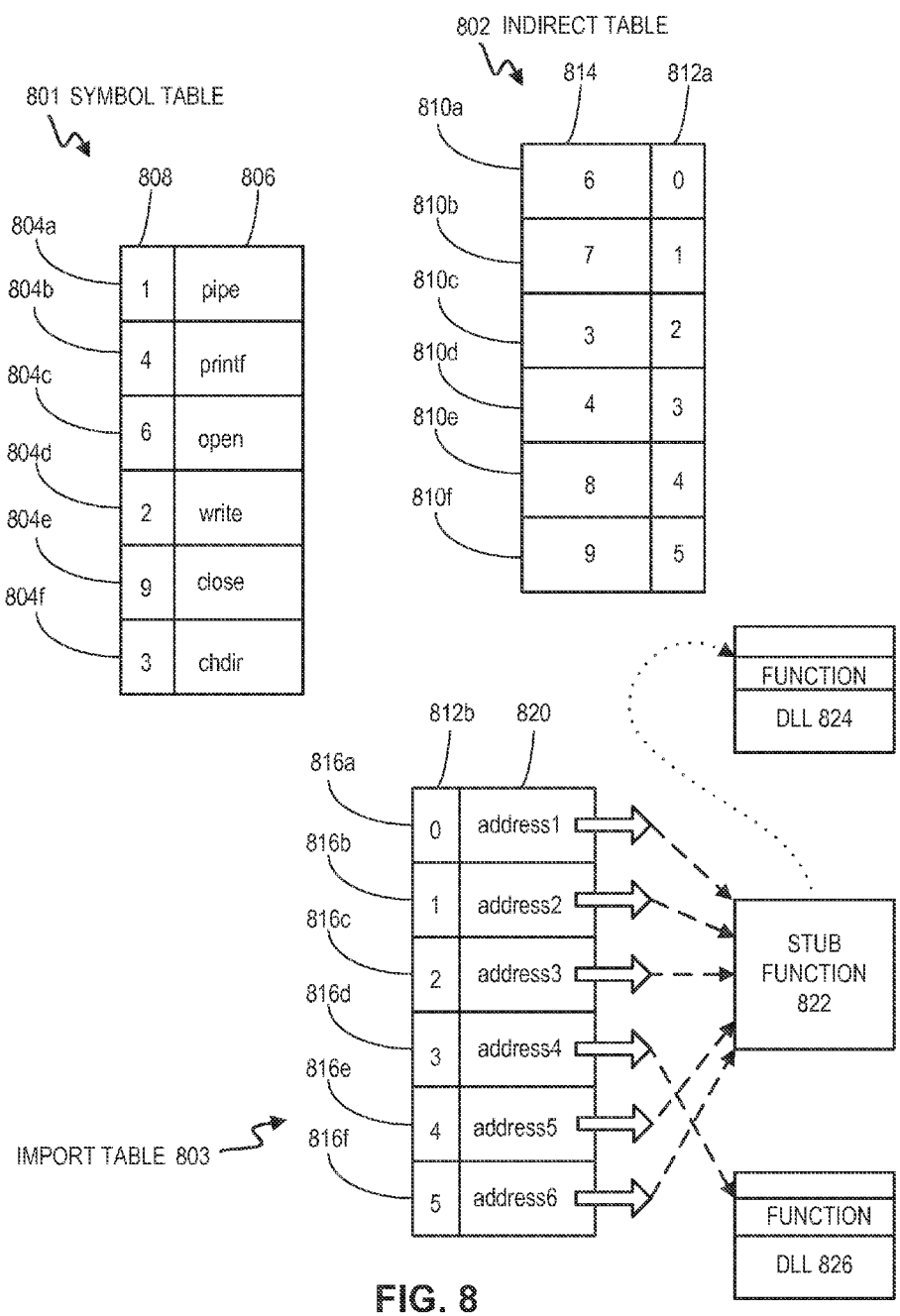
FIG. 8 illustrates an exemplary symbol table, indirect table, and import table, in accordance with an embodiment.

In the drawings and description below, FIG. 4A and FIG. 4B illustrate the structure and module dependencies of an application binary. FIG. 5 illustrates a process for modifying the application binary to cause the operating system loader to load a hook and injection manager module before loading any other module that makes system calls (e.g., modules with dependencies). FIG. 6A and FIG. 6B illustrate a process for launching the modified application binary in which the hook and injection manager completely changes function pointers for all involved system library calls (e.g., in both the application binary and in dependent modules), before any such calls are made during execution. FIG. 7A and FIG. 7B illustrate an example of determining a load order for dependencies and how the hook and injection manager 201 is loaded before any other modules. FIG. 8 and beyond explain how, once loaded, the hook and injection manager 201 changes all function pointers for selected system library calls.

FIG. 4A illustrates an exemplary application object file. In FIG. 4A, an application object file 400, which can be a Mach-O file, includes a header 402, a load command section 404, and a data portion 406. Object file 400 is one example of generic application 206. Header 402 identifies the file type (e.g., Mach-O file) and target architecture, describes the load commands (e.g., number of load commands and number of bytes occupied by the load commands), and has flags affecting the interpretation of the file. Load commands may specify, among other things, the logical structure of the file, the layout of the file in virtual memory, locations of components such as segment and symbol tables, initial execution state of the program's main thread, and/or names of shared libraries that contain definitions for imported symbols (e.g., module dependencies).

Load command section 404 includes a list of load commands. There are different types of load commands. FIG. 4A illustrates three different load command types: LC_LOAD_DYLIB, LC_SIGNATURE, and LC_ENCRYPTION_INFO. LC_LOAD_DYLIB load commands 408 describe module dependencies of the application binary. Each module dependency has a LC_ROUTINES load command which is formatted according to a structure, and one of the fields of this structure points to an INIT function. The INIT function is an initialization function that the operating system loader calls after mapping a module or application binary to memory.

Load command section 404 also includes a security signature LC_SIGNATURE 410, and encryption information LC_ENCRYPTION_INFO 412 for a possibly encrypted _TEXT segment in Mach-o object file 400. Mach-o object file 400 contains segments and sections that form part of the segments (e.g., a _TEXT segment stores the executable code and constant data, and a _DATA segment stores data). Additional detail regarding data section 406 is discussed with reference to FIG. 9A. There may also be filler data, also called padding 414, that is unused space within the binary.

FIG. 4B illustrates a chain of module dependencies, in accordance with an embodiment. In FIG. 4B, application object file 400 references a library1 module 420 (e.g., LIB.C). Library1 module 420 references a library2 module 422 (e.g., LIBRARY.DYLIB), and library2 module 422 references a library3 module 424.

Application object file 400 may rely on one or more libraries to provide certain system functions (e.g., open a file). The system calls in such libraries may also, in turn, make system calls to other libraries. The OS loader maps these library modules into virtual memory, according to an order determined by the loader. The hook and injection manager 201 changes the function pointer values, in all the dependent library modules, to the address of a customized system call, for each interposed system function call.

The hooking and injection process adds an additional hooking and injection module to the Mach-O application binary. To inject the module into the application binary, the wrapping utility tool inserts a load command for the hook and injection manager into the Mach-O file. The hook and injection manager does not depend on any system library. At runtime, the OS loader loads all the dependency modules in the order of dependency. The operating system loader calls the NIT of the hook and injection manager to apply hooking to all the loaded code, which is automatically in the order of dependency.

FIG. 5 illustrates a process for adding a hook and injection manager module to an application binary as a dependency, according to an embodiment. The modifications to the application binary are part of the offline wrapping process, and the process steps depend on whether there is padding within the application binary. Padding is extra characters within the binary that can be removed to accommodate additional load commands or other new data. The padding may be a series of zero characters or other filler. The wrapping utility tool can remove padding to add an additional LC_LOAD_DYLIB load command that defines the name of a dynamic shared library that the application binary links against. At runtime, the dynamic linker uses the LC_LOAD_DYLIB command to locate the shared library, such as the hook and injection manager 201 which does not depend on any other shared libraries. If there is no padding or insufficient padding, the wrapping utility tool can also move existing data to make space for the additional LC_LOAD_DYLIB load command.

The wrapping utility tool initially determines whether there is sufficient padding in the application binary (operation 502). If the binary contains sufficient padding (e.g., padding 414), the wrapping utility tool can remove the padding to add an additional LC_LOAD_DYLIB load command associated with the hook and injection manager 201. The wrapping utility tool moves LC_SIGNATURE 410 and LC_ENCRYPTION_INFO 412 towards data portion 406 to make space for another LC_LOAD_DYLIB load command entry, thereby reducing the amount of padding (operation 504). The wrapping utility then inserts an additional LC_LOAD_DYLIB entry into the space previously occupied by LC_SIGNATURE 310 (operation 506). Since the padding 414 can be removed, the relative position of the data portion 406 stays the same. The wrapping utility tool also modifies header information 402 to include description for the added LC_LOAD_DYLIB load command (operation 508). Subsequently, the wrapping utility tool computes a new signature for the binary and overwrites LC_SIGNATURE 410 with the new signature (operation 510). LC_ENCRYPTION_INFO 412 remains the same since the encryption information is for _TEXT segment in the data portion 406, which does not change.

If there is no sufficient padding (e.g., padding 414 is non-existent) within the application binary, the wrapping utility tool expands the binary file to accommodate a new LC_LOAD_DYLIB entry by moving the _TEXT segment (and other segments) in data portion 406 away from header 402 (operation 512). The wrapping utility tool then updates offsets in the _TEXT segment and/or other segments of data portion 406 (operation 516). Such offsets are from the beginning of the binary file, and hence the update is necessary since the _TEXT segment in data portion 406 has changed location in the application binary. The wrapping utility tool also moves LC_SIGNATURE 410 and LC_ENCRYPTION_INFO 412 away from header 402 (operation 504). The wrapping utility tool then inserts a new LC_LOAD_DYLIB entry for the hook and injection manager module at the former location of LC_SIGNATURE 410 (operation 506). The wrapping utility tool further modifies the header information to include data for the additional load command (operation 508), and creates a new signature for the entire application binary and replaces the signature at the new location of LC_SIGNATURE 410 (operation 510).

The offline modification to the application binary causes the hook and injection manager module to be loaded into the application's process immediately at the launch of the application. The operating system loader determines a loading order for the modules, and loads modules with no dependencies of their own before any modules with dependencies are loaded. The wrapping procedures add a hook and injection manager module that loads before any other modules with dependencies are loaded. When the application is launched, the hook and injection manager 201 will make changes to the application binary and dependent modules after launch but before execution of the application. Those changes replace the library system calls.

FIG. 6A and FIG. 6B together present a flowchart illustrating the process of launching an application with a hook and injection manager module. As illustrated in FIG. 6A, initially, the operating system receives user input to start the application (operation 602). For example, a user may start the application by selecting an application icon on a touch screen. Next, the operating system loader determines the library module dependencies for the application binary (operation 604), and the module load order based on their dependency (operation 606). The process of determining the module load order is discussed in further detail with reference to FIGS. 7A-7B. The loader then loads into memory all the modules in the determined order (operation 608). As discussed previously, the loader loads the hook and injection manager module prior to loading any other modules with dependencies.

After loading all the modules into memory, the loader calls an INIT method of the hook and injection manager module (operation 610). The INIT method may dynamically load an interposition library (operation 612). Note that, in one embodiment, the interposition library 203 is self-sufficient and does not depend on any other library. Then, the INIT method changes function pointer values in the application's executable binary and in the other dependent modules (operation 614).

In one example, the wrapping utility tool may replace an open system call with a customized system call hook_open. If the open system call also depends on a code module (e.g., an input/output module), that code module would have a LC_LOAD_DYLIB entry in the module storing open. The INIT function of the interposition library 203 replaces, in all the modules and the application binary, the function pointer values associated with the open system call. Changing the function pointer values is further discussed with reference to FIGS. 8-12. The changes to the function pointer values replace calls to conventional system libraries with calls to customized libraries.

The loader then calls the INIT method for the remaining dependent library modules. The INIT methods may be called in the same order as the order of loading the various modules (operation 616). After the function calls have been properly interposed or replaced, the operating system then runs the executable code for the program in the application binary (operation 618).

FIG. 7A and FIG. 7B illustrate an exemplary load order for module dependencies, in accordance with an embodiment. An application has module dependencies, and each dependency module may also have other dependencies. The loader first loads basic system libraries which have no dependencies. In order to determine a loading order, the loader performs a topological sort of the application binary and dependent modules. By ensuring that the hook and injection manager module has no dependencies, the wrapping utility tool can cause the operating system to load the hook and injection manager module before loading any other modules that make library calls. The hook and injection manager can then make the changes to the application binary or libraries to interpose or replace library calls, before the actual execution of any code within the application or modules.

In FIG. 7A, an application A 702 has dependencies module B 704, module E 706, and module D 708. Module E 706 has dependencies module C 710 and module H 712. Module C 710 has one dependency module F 714. Module H 712 has two dependencies module G 716 and module C 710. The loader can perform a topological sort of the nodes in FIG. 7A to determine a loading order. A topological sort of a directed acyclic graph is a linear ordering of the graph's nodes such that, for every edge uv, node u comes before node v in the ordering. The result may not be a unique ordering, since there may be multiple such orderings.

FIG. 7B illustrates an exemplary loading order for the modules. Module G contains the executable code for interposing system calls. The loader determines that module G 716 has no dependencies, and therefore module G 716 should be loaded first. Application A 702 is loaded last. Note that since module F does not make any library calls, the loader can also load module F before loading module G.

Figure 9A:
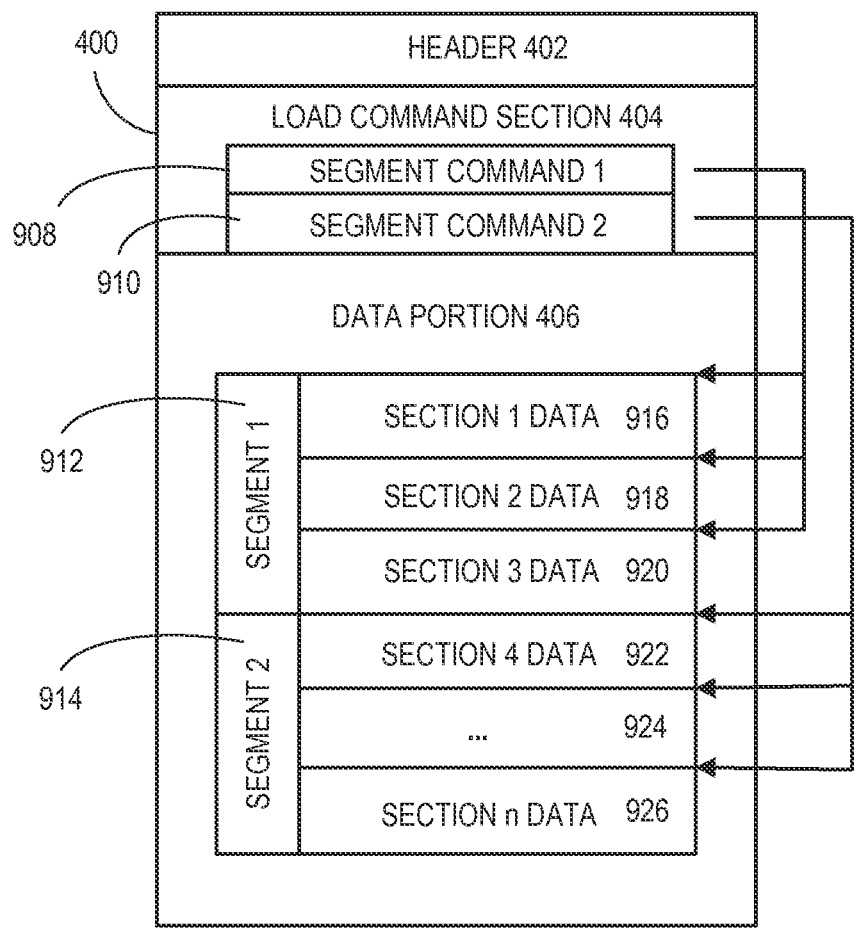
FIG. 9A illustrates the exemplary file format structure of FIG. 4A with segments and sections, in accordance with an embodiment.
Figure 10:
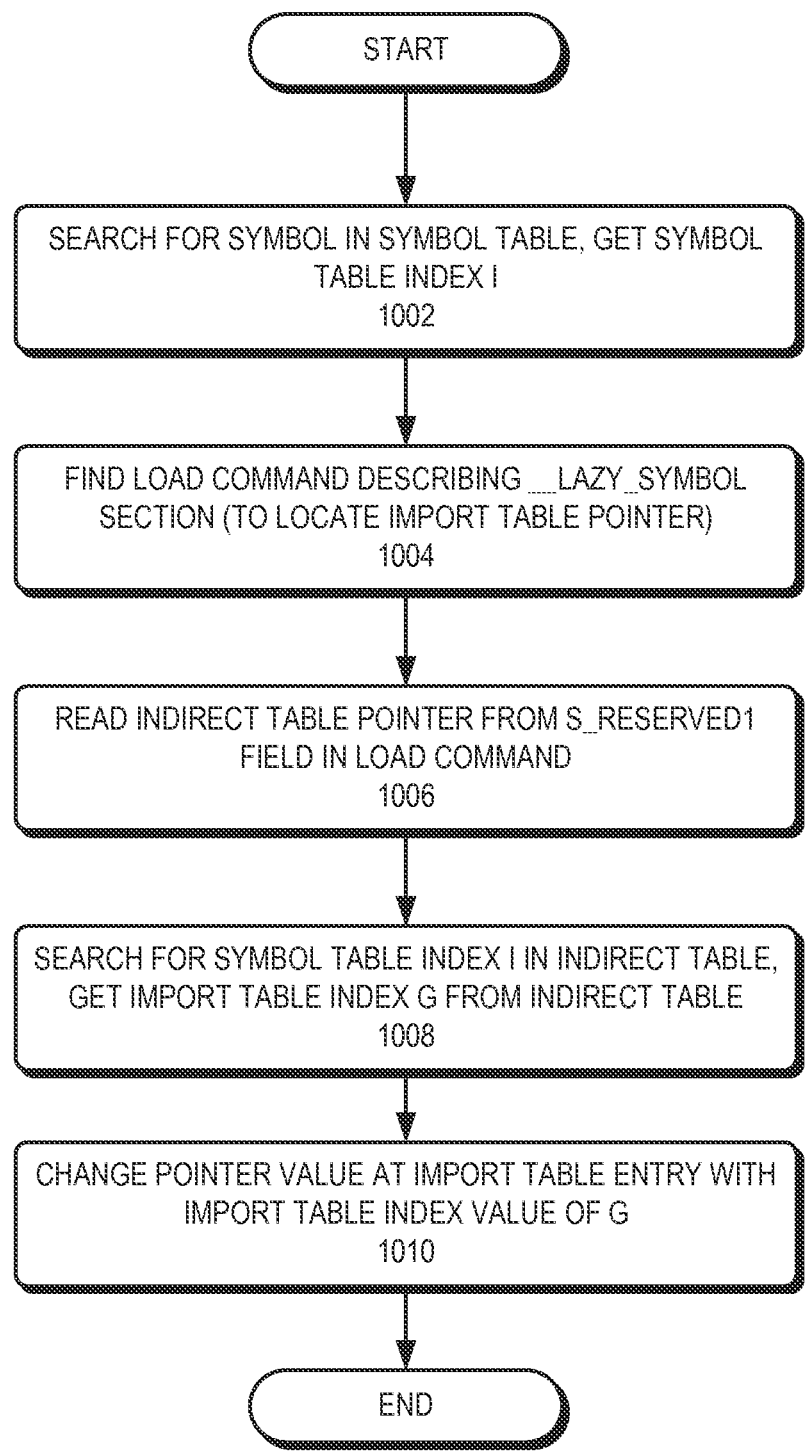
FIG. 10 presents a flowchart illustrating an exemplary process for replacing function pointer values in an import table, in accordance with an embodiment.
Figure 11:
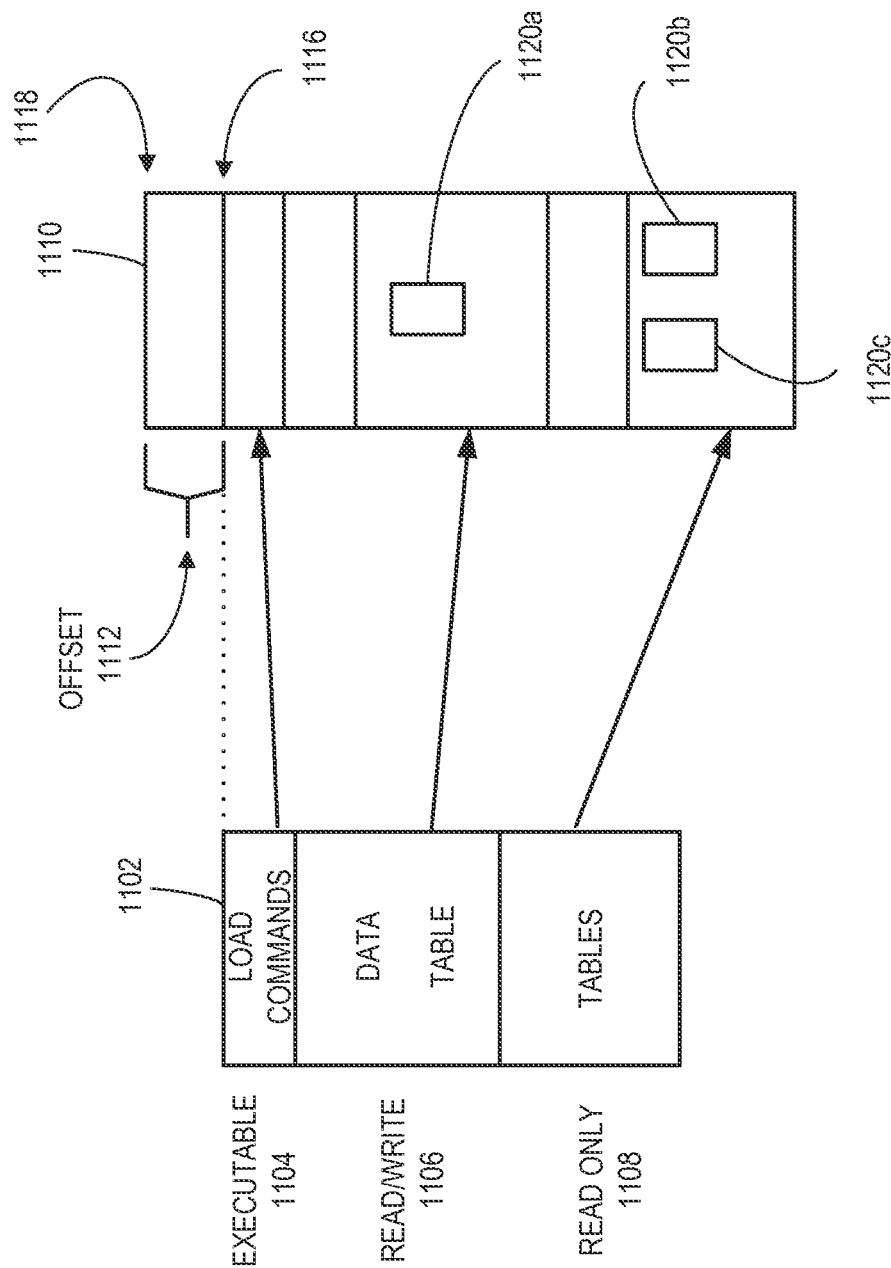
FIG. 11 illustrates an exemplary mapping of a shared library cache to segmented virtual memory, in accordance with an embodiment.
Figure 12:
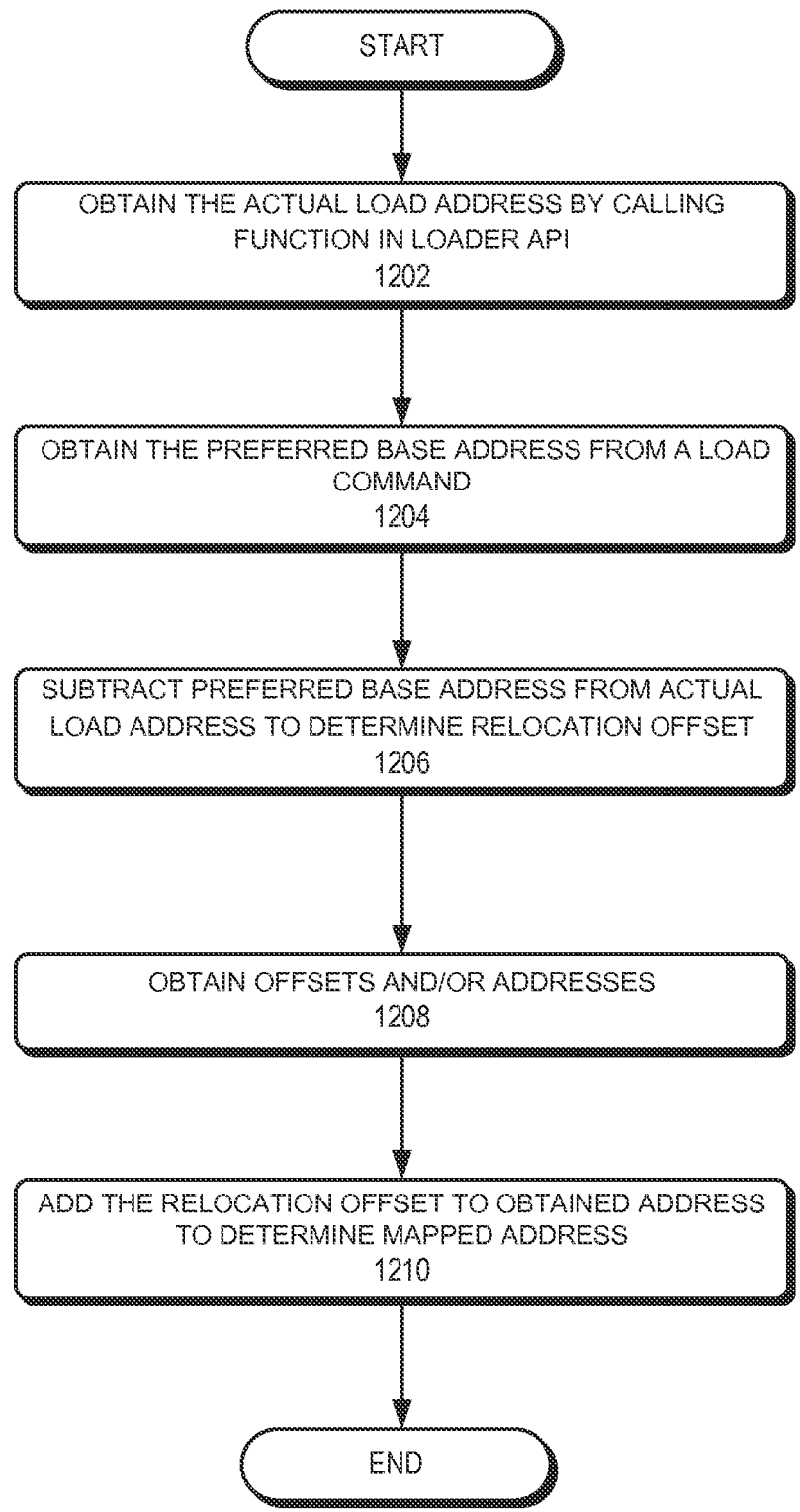
FIG. 12 illustrates steps to replace function pointer values in libraries mapped from a shared cache, according to an embodiment.

In the drawings and description below, FIG. 8 illustrates and describes the various tables that the hook and injection manager 201 references and/or modifies in order to change function pointer values for a system library call. FIG. 9A illustrates and describes the relevant portions of an application binary used to access to the various tables. FIG. 10 illustrates and describes a process for changing the function pointer values in an import table for a system library call. FIG. 11 illustrates and describes how libraries are mapped from a cache to segmented virtual memory, and FIG. 12 illustrates and describes how to locate tables in segmented virtual memory. By completely changing all function pointers for a system library call in both the application binary and the library modules, the hook and injection manager 201 can successfully interpose the system library call.

FIG. 8 illustrates an exemplary symbol table 801, indirect table 802, and import table 803, in accordance with an embodiment. A symbol table contains, in each table entry row, a mapping of a symbol (e.g., function name) to index information that can be used to determine which entry of an import table contains a function pointer for the function. A function pointer points to the location of the function's executable code within memory. Each symbol table entry is a data structure of type nlist. Note that symbol table 801 is a global symbol table.

An import table contains, in each table entry, a mapping from an index associated with a function symbol to an address (or function pointer) for the function associated with the symbol. Each function pointer holds an address at which the code for the function may be found. Note that each application binary stores different content within the import table associated with that application. An import table contains the addresses for functions that are not defined in the application binary, but rather are imported from a different file. The import table may be a lazy symbol table or a non-lazy symbol table. The loader does not determine the address of a function with a function pointer listed in a lazy symbol table until the first time that the function is called (e.g., first invocation of the function). The loader determines the address of a function with a function pointer listed in the non-lazy symbol table at the time the module or executable is loaded or mapped into memory.

An indirect table connects the information in the symbol table and the import table by providing a mapping between the indices in the two tables.

In FIG. 8, symbol table 801 includes a list of symbol entries 804a-804f. Each of symbol entries 804a-804f includes a symbol in a symbol column 806 and a symbol index value in a symbol index column 808. Note that the symbol table 801 may be a global symbol table, and includes all symbols referenced in a file plus symbols from imported modules.

Indirect table 802 includes a list of indirection entries 810a-810f. Each of indirection entries 810a-810f includes an import index value in an import index column 812a, and a symbol index value in a symbol reference column 814. Note that the symbol index values in the symbol reference column 814 (in indirect table 802) may be cross-referenced against the symbol index values in the symbol index column 808 (in symbol table 801).

Import table 803 contains a list of function pointers for functions imported from a different file (e.g., imported from a library module). Import table 803 includes a list of function pointer entries 816a-816f. Each of function pointer entries 816a-816f includes an import index value stored in an import index column 812b, and a function pointer (e.g., address) column 820. Each of function pointer entries 816a-816f stores a mapping between an import index value associated with a library function and an address associated with that library function. For example, entry 816d may store a function pointer value (e.g., an address) associated with the printf system call. The function pointer values can be offset values representing the addresses of function code. The index values of import index column 812a in indirect table 802 correspond to (or are same as) the index values in import index column 812b in import table 803.

Note that prior to changing the function pointer values, the function pointer values in all of entries 816a-816f may be the address of a stub function 822 (e.g., dyld_stub_binder). When stub function 822 receives, as input, an import index value (or offset address), stub function 822 outputs a function pointer value (e.g., address) of the function associated with the input import index value. The application can then call the function (e.g., stored in a system-loaded DLL 824) using the address received from stub function 822. Note that different systems may implement the specific details of calling a function using a stub function in different ways. Some systems may need to perform multiple mappings to determine the function address in the system-loaded DLL 824.

With the techniques described herein, the hook and injection manager 201 obviates the need to use stub function 822. Hook and injection manager 201 substitutes conventional system library calls with customized system library calls by changing the addresses stored in the import table entries to the addresses of the customized system calls. For example, hook and injection manager 201 can change the function pointer entry 816d to store an address for a customized function located in DLL 826, instead of the address for stub function 822. In one embodiment, the hook and injection manager 201 can determine the table entry for changing a function address in the import table by referencing the indirect table 802. The hook and injection manager 201 references the symbol reference column 814 in indirect table 802 in order to determine the proper table entry for import index column 812b in import table 803. Additional details of the process for determining the appropriate entry in import table 803 for replacing a function pointer value is discussed with reference to FIG. 10.

Embodiments of the present invention also change pointer values in non-lazy symbol tables. In some instances, functions are called by function pointer instead of function name. For example, if the address of an open system call is held in a function pointer, the application code can call open using the function pointer (instead of using the open symbol). The lazy symbol table contains only the system library calls that are called by function symbol (e.g., open or printf). In contrast, a function symbol is present in a non-lazy symbol pointer table if the function is called using a function pointer.

By changing pointer values in non-lazy symbol tables, a system call made through a function pointer can be redirected to the customized system call. Hook and injection manager 201 can access the non-lazy pointer table by looking up a load command associated with the non-lazy pointer table. Note that the non-lazy pointer table is present in both the application binary and the library modules.

Thus, all possible scenarios for making a system library call are covered: 1) a call can be made from within an application binary or from within a library module and 2) a system library call can be made by symbol or by function pointer. The techniques disclosed herein covers the different ways a system library call can be made within a system process and facilitates implementation of the policy enforcement mechanism 208.

Note that implementations of the tables as illustrated in this specification may contain more or less than the number of entries or columns depicted. Embodiments of the present invention are not limited to any particular number of entries or columns in the tables.

FIG. 9A illustrates the exemplary file format structure of FIG. 4A with segments and sections, in accordance with an embodiment. The file format structure (e.g., Mach-O file format structure) of FIG. 4A includes segments and sections that are illustrated in FIG. 9A. A segment defines a range of bytes in a file and the addresses and memory protection attributes at which those bytes are mapped into virtual memory. Each segment includes zero or more sections. Each section of a segment contains a particular type of code or data.

In FIG. 9A, the (e.g., Mach-O) application object file 400 file format structure includes a header 402, load command section 404, and a data portion 406. Load command section 404 includes one or more load commands 908, 910 (shown as segment commands 1, 2 in FIG. 9A). Note that load commands 908, 910 may be any type or number of load commands, including the load commands discussed with reference to FIG. 4A. Load commands for segments may include fields such as vmaddr, which indicates the starting virtual memory address of a segment, or fileoff, which indicates the offset in the file of the data to be mapped at vmaddr, or vmsize, which indicates the number of bytes of virtual memory occupied by the segment. A segment load command may also include nsects, which indicates the number of section data structures that follow the load command. Data portion 406 includes one or more segments 912, 914. Segment 912 (shown as segment 1 in the figure) includes sections 916, 918, 920, and segment 914 (shown as segment 2 in the figure) includes sections 922, 924, 926.

The hook and injection manager 201 searches through the load commands to find a pointer holding an address of the indirect table and the pointer holding an address of an import table. Load commands may describe the name and type of segments and sections, and each segment is described by a load command In the segment load commands (e.g., LC_SEGMENT type of load commands), following a segment_command data structure is an array of section data structures that describe sections. The section data structures include a S_RESERVED1 field. In a section with symbol pointer type (e.g., S_LAZYSYMBOL type), the S_RESERVED1 field is a pointer holding the address of the indirect table (e.g., pointing to indirect table 802 in FIG. 8). The hook and injection manager 201 can linearly search through all the segment load commands to find the load command for a _lazy_symbol section in the _DATA segment. The _lazy_symbol section structure has a S_RESERVED1 field holding the address for the indirect table. Within the same _lazy_symbol section structure, the hook and injection manager 201 can also find a pointer to the import table.

Note that the hook and injection manager 201 can also find a pointer to the non-lazy symbol table in an analogous manner. Hook and injection manager 201 can search for a _non_lazy_symbol section structure in the _DATA segment data structure, and obtain a pointer to the non-lazy symbol table and pointer to a corresponding indirect table.

The hook and injection manager 201 can locate and examine a load command (e.g., LC_SYMTAB type) to determine the size and location of the symbol table. After determining the memory locations of indirect table 802, symbol table 801, and import table 803, the hook and injection manager 201 can replace one or more addresses held in the function pointers of the import table and non-lazy symbol table. FIG. 10 illustrates and describes a function interpose process that uses these techniques to locate the various tables.

FIG. 10 presents a flowchart illustrating an exemplary process for replacing function pointer values in an import table, in accordance with an embodiment. The process described with reference to FIG. 10 may be performed by the hook and injection manager 201. Upon launch of a modified application, the loader loads the hook and injection manager module, the hook and injection manager 201 dynamically loads the interposition library 203, and the hook and injection manager 201 may interpose on one or more functions by calling an interposition function The process described in FIG. 10 can be implemented as an interposition function in the interposition library 203. Such an interposition function may accept, as input, a function name (e.g., symbol representing the function) and an address for customized function code (e.g., hook_api ("printf", hook_printf)). The interposition function performs a series of steps to determine which function pointer entry in the import table is associated with the function name. The interposition function changes the original function address held by the function pointer to the address for the customized function. Note that the description for FIG. 10 uses the lazy symbol pointer table as the import table, but analogous steps may also be performed for non-lazy symbol pointer table.

During operation, hook and injection manager 201 initially searches for a function symbol (e.g., printf function symbol) in the symbol table (operation 1002). For example, from the symbol table 801, hook and injection manager 201 obtains the symbol table index value of 4 (e.g., entry 804b) for the printf function symbol. Next, hook and injection manager 201 searches through the load commands to find a load command describing a _lazy_symbol section in a _DATA segment (operation 1004). From the load command's section structure, hook and injection manager 201 obtains a pointer to the import table. Subsequently, the hook and injection manager 201 obtains a pointer to the indirect table from the S_RESERVED1 field of the same load command's section structure (operation 1006). Note that the hook and injection manager 201 can also obtain the pointers to the indirect table and/or import table prior to searching through the symbol table for the symbol. Embodiments of the present invention are not limited to any particular ordering of the steps described in the process.

Using the pointer to the indirect table and symbol table index value (e.g. 4), the hook and injection manager 201 can search (e.g., linearly) through the indirect table in column 814. Once the hook and injection manager 201 finds the symbol table index value i (e.g. i=4) in the indirect table, the hook and injection manager 201 obtains the corresponding import table index value g (e.g., g=3) from the indirect table (operation 1008). For example, in FIG. 8, the import table index value of 3 is located at entry 810*d* of indirect table 802. The hook and injection manager 201 then searches for and changes the pointer value at the import table entry of index value g (e.g., entry 816*d*) (operation 1010). The hook and injection manager 201 replaces the current system call address pointed to by the pointer with the new address of the customized system call. For example, the hook and injection manager 201 changes the pointer value at entry 816*d* to a new address for printf. Thus, the hook and injection manager 201 is able to intercept system library calls and redirect the library calls to customized functions. This interposition mechanism allows the enterprise to control all communications of the application and facilitates implementation of policy control mechanism 208.

In the following, FIG. 11 illustrates a shared library cache, and FIG. 12 illustrates the steps for replacing function pointer values for libraries loaded from the shared cache of FIG. 11.

FIG. 11 illustrates an exemplary mapping of a shared library cache to segmented virtual memory, in accordance with an embodiment. In some operating systems (e.g., iOS), system libraries are stored in a shared cache. Unlike the loading of an application binary to contiguous memory locations, the loader maps the cached libraries into segmented virtual memory locations.

In FIG. 11, a shared library cache 1102 stores system library modules, and includes an executable portion 1104 that stores load commands, a read and write portion 1106 that stores data and a table, and a read-only portion 1108 that stores tables. The operating system loader maps system libraries from shared library cache 1102 to segmented virtual memory 1110. The executable portion is mapped to virtual memory location 1116, which is the actual load address. Virtual memory location 1116 may be different from a preferred base address; such a preferred base address is described in a load command of the executable portion 1104.

Hook and injection manager 201 can calculate a relocation offset (e.g., relocation offset=actual load address−preferred base address) to compensate for not mapping the executable portion 1104 to the preferred base address. Hook and injection manager 201 also calculates an offset 1112 that indicates the amount of memory space between the beginning of the virtual memory space 1118 and virtual memory location 1116. The actual mapped locations of import tables, executable portion, read/write portion, function pointers, etc. can then be computed using offset 1112 and the relocation offset.

The hook and injection manager 201 may traverse through the shared libraries in memory 1110 to change function pointer values. Note that traversing through the portions of segmented virtual memory 1110 storing the shared libraries is not a straightforward task, since the portions of virtual memory storing the shared libraries are not necessarily contiguous. The steps to traverse the loaded library modules to change the function pointer values in import tables 1120*a*, 1120*b*, and 1120*c* are discussed with reference to FIG. 12. Note that import tables 1120*a*, 1120*b*, and 1120*c* can be either a lazy symbol table or a non-lazy symbol table.

FIG. 12 illustrates steps to replace function pointer values in libraries mapped from a shared cache, according to an embodiment. Compared to the technique to replace function pointer values in a loaded application binary, a different technique is used to traverse segmented virtual memory locations to change function pointer values. The following steps may be performed by the NIT method of the hook and injection manager 201. Note that since any function may make a system call, including customized library functions, or functions within standard system libraries, the hook and injection manager 201 must go through all the loaded modules and change all pointer values for a conventional library function to point to a customized library function.

For shared libraries mapped from a shared cache, the hook and injection manager 201 first calculates an offset 1112 and then calculates a relocation offset, to determine the mapped locations of import tables and function pointers in segmented virtual memory. The hook and injection manager 201 initially obtains the actual load address (e.g., virtual memory location 1116) by calling a function in the loader API (operation 1202). Next, the hook and injection manager 201 obtains the preferred base address from a load command (operation 1204). Note that the preferred base address is the address of the _TEXT segment in shared library cache 1102. Hook and injection manager 201 can obtain the address of the preferred base address by reading a LC_SEGMENT load command. The hook and injection manager 201 then subtracts the preferred base address from the actual load address to determine the relocation offset (operation 1206). Note that the relocation offset may be a positive or negative value. The hook and injection manager 201 can then obtain various addresses (e.g., address of the lazy symbol pointer section or address of the non-lazy symbol pointer section) and/or offsets from shared library cache 1102 (operation 1208). Also, the hook and injection manager 201 determines offset 1112 by computing the difference between actual load address and beginning of virtual memory space 1118 (e.g., offset 1112=virtual memory location 1116−beginning of virtual memory space 1118).

Finally, the hook and injection manager 201 adds the relocation offset to an address (e.g., address of the lazy symbol pointer section or address of the non-lazy symbol pointer section) to determine the mapped virtual memory address (operation 1210). Note that if the relocation offset is a negative value, then the absolute value of the relocation offset is subtracted, rather than added, from the address. For example, if preferred base address is 100 and the actual load address is 90, then the relocation offset is −10. Then, if the address of a section read from a load command is 150, then the mapped address in the segmented virtual memory is 140. Similar computations are made for the mapped addresses of tables in the read/write section 1106 and tables in the read-only section 1108. The hook and injection manager 201 can determine the offsets of the tables in the read/write section 1106 and the read-only section 1108, add the relocation offset, and then change function pointer values in the tables.

System Architecture

Figure 13:
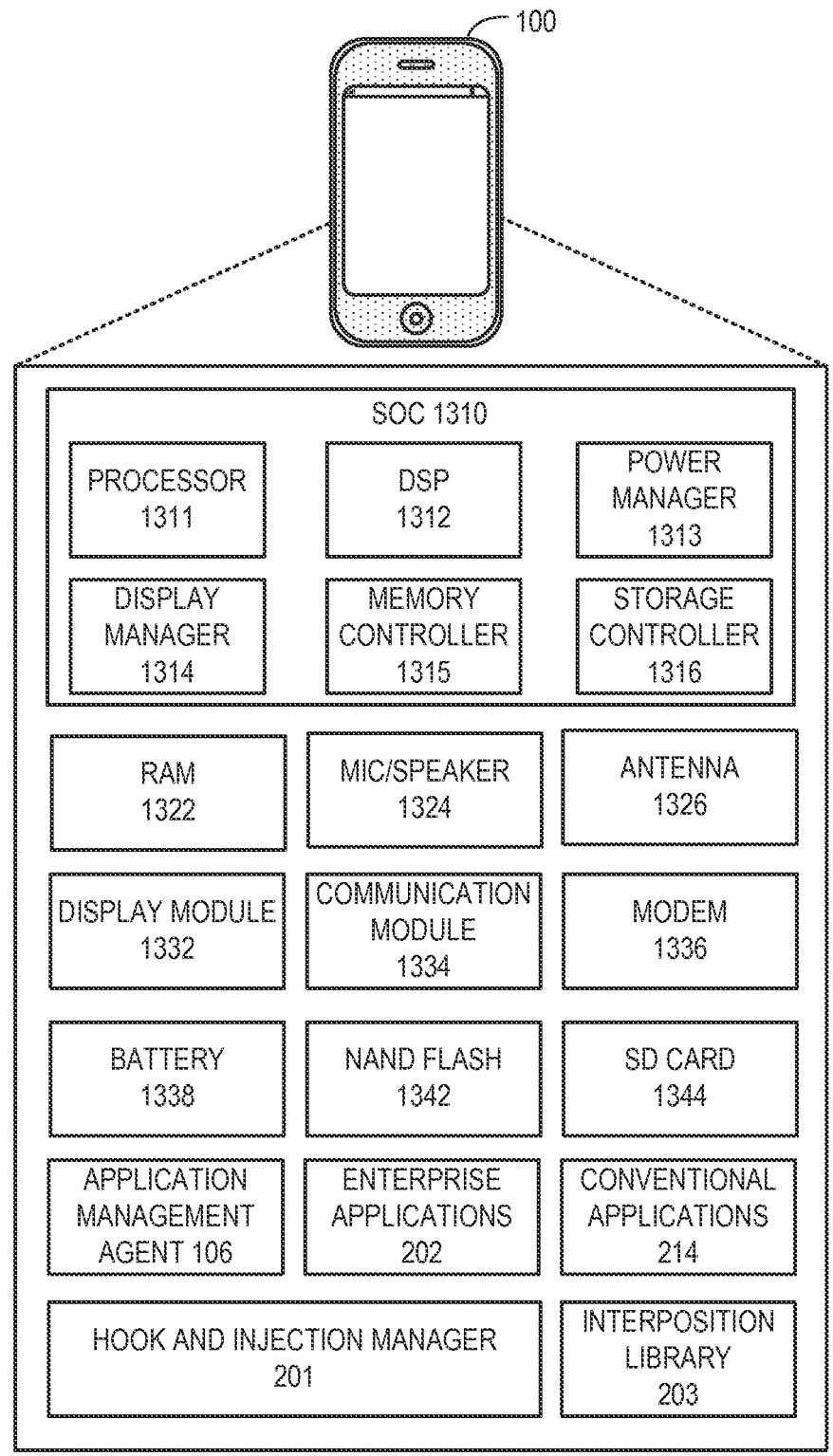
FIG. 13 illustrates an exemplary architecture of a mobile device that supports isolated workspace, in accordance with an embodiment.

FIG. 13 illustrates an exemplary architecture of a mobile device that supports isolated workspace, in accordance with an embodiment. A mobile phone 100 includes a system on a chip (SoC) 1310 that provides the basic functionality to the system. SoC 1310 includes a processor 1311 that executes the operations of system 100. Digital signal processor 1312 performs the signal processing, such as analog to digital conversion, for system 100. Power manager 1313 controls battery 1338. Display manager 1314 controls display module 1332 and provides display to a user. In some embodiment, display module includes a liquid crystal display (LCD). Memory controller 1315 allows processor 1311 to access random access memory (RAM) 1322. Storage controller 1316 provides accesses to internal and external storage of system 700.

Microphone/speaker module 1324 allows a user to perform regular voice operations. Communication module 1324 uses antenna 1326 and modem 1336 to connect to a telephone network. NAND flash 1342 is the internal storage and SD card 1344 is the external storage for system 100. Integrity module 1352 performs integrity checks on NAND flash 1342 and SD card 1344. Application management agent 106 manages enterprise applications 202 and maintains isolated workspace 104. Also included in SoC 1310 are a set of conventional applications 214. Hook and injection manager 201 and interposition library 203 form part of the wrapper that facilitates enforcement of enterprise policies.

Note that the above-mentioned modules can be implemented in hardware as well as in software. In some embodiments, one or more of these modules can be embodied in computer-executable instructions stored in a memory which is coupled to one or more processors in system 100. When executed, these instructions cause the processor(s) to perform the aforementioned functions.

In summary, embodiments of the present invention provide a system and a method for facilitating replacement of a system call in an application with a customized function call. During operation, the system adds a load command to an object file for the application, wherein the load command can cause an operating system loader to load, during run time, code that does not make any call to libraries, and wherein during run time the loaded code can change a pointer in a table which indicate addresses of imported functions so that the pointer indicates an address of the customized function call.

Secure Inter-Process Communication and Virtual Workspaces on a Mobile Device As further described herein, one or more embodiments provide a capability for enterprise applications that are installed on a personal mobile device to securely communicate and share resources (e.g., sharing access to a common copy/paste buffer, etc.) with each other while simultaneously preventing non-enterprise applications from engaging in such secure communication or accessing such shared resources. Prior to being installed on a personal mobile device, enterprise applications are subject to an "application wrapping" process to interpose on application library calls and access to system services by hooking library function call tables and making use of language runtime reflection techniques. As further described herein, such interposition enables an enterprise's IT department to dictate application security policies (e.g., all files must be encrypted and PIN protected, etc.) and securely provide credentials for corporate data to wrapped enterprise applications.

In one embodiment, enterprise applications, which have gone through such a wrapping process, are selected and installed by the end user of a personal mobile device through an "application management agent" application already installed on the personal mobile device that offers a enterprise application store or catalog function (although alternative embodiments may use a separate enterprise application store application that is separate from the application management agent). Once the enterprise applications have been installed onto the personal mobile device, they form a "virtual" enterprise "workspace," by communicating with the application management agent to obtain security policy and credentials that enable the enterprise applications support file and cut/copy/paste functionality amongst each other and share common settings such as, for example, a PIN lock status for the virtual workspace. The virtual workspace is thus isolated from the rest of the personal mobile device—a file opened by an enterprise application that is part of the workspace, for example, will not be shareable with applications or processes outside the workspace. Such a virtual workspace, as further described below, is effective even in mobile device operating systems, such as Apple's iOS, which currently do not provide traditional inter-process communication (IPC) between, for example, the application management agent and enterprise applications.

Because certain mobile device operating systems, such as Apple Inc.'s iOS, do not provide inter-process communication (IPC) mechanisms for communication among applications, embodiments herein achieve a secure inter-process communication amongst enterprise applications and other "workspace" components (e.g., application management agent, etc.) on a personal mobile device by securing the mobile operating system's "pasteboard" and URL handling mechanisms when used by the enterprise applications. In addition to providing a general pasteboard for typical cut/copy/past operations by an end user, mobile device operating systems may also provide the capability (e.g., via programmatic APIs) for applications to create their own pasteboards to share data for specific purposes. Such pasteboards are typically implemented as unsecured named shared memory regions accessible by any application running on the mobile device. Mobile device operating systems also typically provide an application the capability to invoke a function in another application via a mechanism known as "URL handling." Embodiments herein utilize cryptographic techniques in order to secure these unsecured mechanisms (e.g., pasteboard and URL handling) to enable the previously discussed virtual enterprise workspace abstraction.

As previously discussed, in certain embodiments, a virtual workspace implemented by securing communications among installed enterprise applications and the application management agent (i) isolates the applications in the workspace (e.g., enterprise applications that have been wrapped, as previously discussed) from other applications on the personal mobile device (for example, any sharing of data relating to an enterprise application occurs on a separate pasteboard on the personal mobile device, secured from applications outside the workspace), and (ii) provides other enterprise desired features such as common authentication to a VPN gateway, single sign-on, credential management, pin lock screens, etc.

Figure 14:
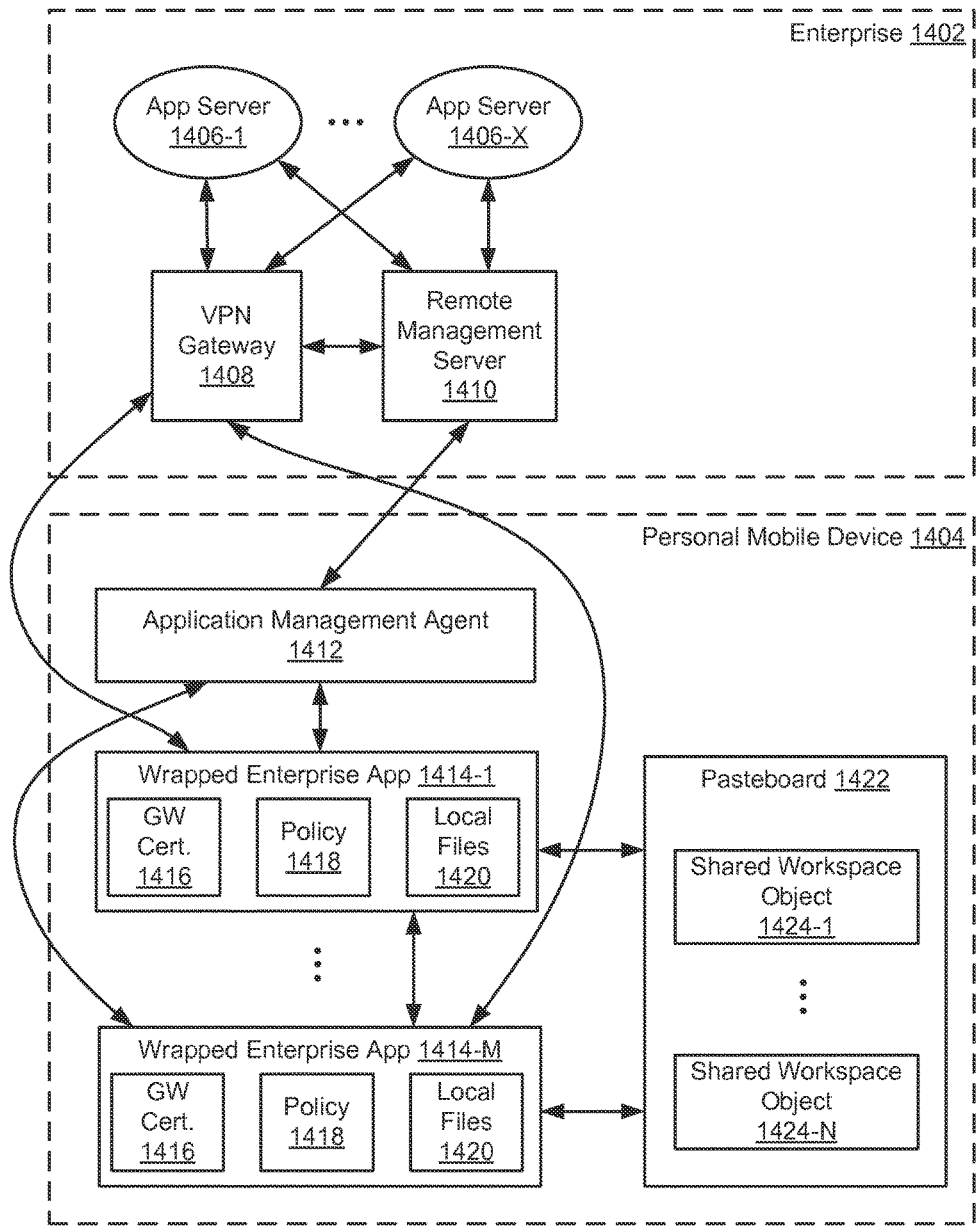
FIG. 14 is a block diagram that illustrates one embodiment of the components on a personal mobile device and in an enterprise, as well as their communication relationships.

Enterprise applications in the workspace may be further subject to enterprise security policies set by a remote management server located on or otherwise controlled by the enterprise. FIG. 14 is a block diagram that illustrates one embodiment of the components on a personal mobile device 1404 (also referred to as a handset) and in an enterprise 1402, as well as their communication relationships. Enterprise 1402 includes a VPN gateway 1408 coupled to a remote management server 1410. Enterprise 1402 further includes app servers 1406-1 through 1406-X (collectively "app servers 1406"), where X is an integer greater than zero.

Each of VPN gateway 1408 and remote management server 1410 is coupled to each of app server 1406-1 through 1406-X. Personal mobile device 1404 includes an application management agent 1412, a pasteboard 1422, and wrapped enterprise applications 1414-1 through 1414-M (collectively "wrapped enterprise applications 1414" or "wrapped applications 1414" or singularly "wrapped enterprise application 1414" or "wrapped application 1414"), where M is an integer greater than zero. Each of wrapped apps 1414 includes a gateway certification (GW cert. 1416), a policy 1418, and local files 1420. Pasteboard 1422 includes shared workspace objects 1424-1 through 1424-N (collectively "shared workspace objects 1424"), where N is an integer greater than zero.

As previously discussed, certain embodiments of application management agent 1412 provide an enterprise application store or catalog and a user interface for authenticating the end user to the workspace. For example, the end user may be able to select enterprise applications from the enterprise application catalog, which are then wrapped and provisioned to personal mobile device 1404. In one embodiment, such wrapping involves injecting certain code into the enterprise application archive file (e.g., an iPhone® application archive file or .ipa file for an Apple iOS embodiment, etc.) that enables runtime interposition on library calls (e.g., C or Objective C in an Apple iOS embodiment, etc) to facilitate the enforcement of security policies and provide the virtual workspace abstraction.

In one embodiment, when such a wrapped enterprise application 1414 is first installed on personal mobile device 1404, wrapped enterprise application 1414 receives a set of credentials, for example, in the form of certificates and authorization tokens (e.g., OAuth tokens, etc.), and a security policy 1418 from application management agent 1412, which in turn obtains security policy 1418 from remote management server 1410. The foregoing process (i) may involve a sequence of user interactions with application management agent 1412 which, in turn, may communicate with remote management server 1410, or (ii) may rely on cached credentials from previous interactions of application management agent 1412 with the remote management server 1410, although in an alternative embodiment, a wrapped enterprise application 1414 may obtain the credentials and security policies by directly communicating with remote management server 1410 (and/or other application servers at enterprise 1402). The security policies and credentials may have an associated lease period, which upon expiration, necessitates further communication between wrapped enterprise application 1414 and application management agent 1412.

Embodiments of wrapped enterprise applications 1414 may have their network traffic redirected over secured tunnels (e.g., SSL VPN, etc.) to an enterprise gateway, such as VPN gateway 1408 Certificates 1416 to authenticate with the VPN may be provided by application management agent 1412 to wrapped enterprise application 1414 as part of a credential bundle. Wrapped enterprise applications 1414 can, for example, then directly communicate with application servers 1406 in enterprise 1402 over such a tunnel These application servers 1406 may have additional authentication requirements and may provide tokens (e.g., OAuth tokens, etc.) to facilitate this.

In one embodiment, the workspace provides the following features:
- A PIN lock (or other authentication screen) that provides end user authentication to the workspace. Wrapped applications 1414 are locked until the end user is authenticated with the pin lock (or other authentication credential), at which point all wrapped applications 1414 are accessible until a security policy-determined point in time (e.g., a certain period of inactivity, etc.). Alternative embodiments may have rings of protection, rather than a single authentication point, in which low-grade security apps (e.g. calendar application, etc.) are protected by weaker but more convenient PINs (or other authentication credentials) and high-grade security apps (e.g. corporate document reader, etc.) have PINs (or other authentication credentials) with stricter policies.
- A workspace specific pasteboard that facilitates cut/copy/paste operations when an end user uses the wrapped enterprise applications, similar to the general pasteboard of the mobile device operating system, but isolated and inaccessible to non-wrapped applications that are not part of the workspace.
- URL handlers for opening files of a given type. For example, if a wrapped Microsoft Word® document viewer is associated with .docx files, another wrapped enterprise application can then utilize the mobile device operating system's URL handling mechanisms for opening such files.

In order to providing the above features in a workspace, embodiments facilitate secure communication among wrapped enterprise applications 1414, both point-to-point and through the mobile operating system's pasteboard capabilities.

For example, in order to facilitate secure communication between wrapped enterprise applications 1414 and application management agent 1412:
- Wrapped enterprise applications 1414 may register themselves with application management agent 1412 upon installation in order to receive their initial security policy settings and credentials.
- Upon expiration of a lease period that may be specified by a policy setting provided by remote management server 1410 to application management agent 1412 (as previously discussed), a wrapped enterprise application 1414 may obtain additional security policy and/or credentials from application management agent 1412.
- Applications that are not part of the workspace (e.g., non-wrapped applications) are not be able to register with application management agent 1412 and obtain credentials.
- Due to the sensitive nature of the credentials being communicated between wrapped enterprise applications 1414 and application management agent 1412, both their confidentiality and integrity should be guaranteed in the presence of a malicious non-wrapped app present in the system.

Similarly, in order to facilitate communication among wrapped enterprise applications 1414 themselves:
- A "virtual" pasteboard for use among wrapped enterprise applications 1414 only, as further discussed below may be provided through which libraries that have been injected into wrapped enterprise applications 1414 during the wrapping process may use to impersonate the general and named pasteboards.
- Applications that are not part of the workspace (e.g., non-wrapped applications) are not able to view or modify (without detection) any of shared objects 1424 in pasteboard 1422.

A common key-value store for shared settings among wrapped enterprise applications 1414, such as those required for implementation of the common PIN lock, may be made available.

File URL handling is also "virtualized" as discussed below.

Initialization of the Application Management Agent

In certain embodiments, application management agent 1412 may be installed by the end user of personal mobile device 1404 from a typical public mobile application store, such as, for example, Apple Inc.'s own official App Store. Once installed on personal mobile device 1404, certain embodiments of application management agent 1412 may generate the following:

- a first "workspace" cryptographic key (e.g., 256-bit AES, etc.) for protecting the confidentiality of shared workspace data.
- a second "workspace" cryptographic key for (e.g., a 256-bit key) to use with a hash-based message authentication code (e.g., SHA256-HMAC) for protecting the integrity of the shared workspace data (although it should be recognized that any other types of message authentication code or hashing algorithms or technologies may be utilized in alternative embodiments).
- a "workspace" suffix (e.g., 128-bit hex encoded and randomly generated, etc.) to generate a name for a specific pasteboard 1422 (e.g., using the UIPasteboard functionality in Apple iOS, etc.) created for use by end users who desire to perform cut/copy/paste operations when running wrapped enterprise applications 1414 (as the previously mentioned). Such a "workspace" suffix may be, for example, appended to a first name (e.g., com.enterprisename.workspace.workspaceSuffix) to create a name for a specific pasteboard to share workspace settings and a second name (e.g., com.enterprisename.pasteboard.workspaceSuffix) for the general workspace and application-specific pasteboards, as further discussed below.

The above keys may be stored, for example, in a "keychain" service provided by the mobile operating system (e.g., iOS keychain service) for application management agent 1414 with an attribute that restricts access to only when personal mobile device 1404 is unlocked (e.g., kSecAttrAccessibleWhenUnlockedThisDeviceOnly in Apple iOS), maintaining the keys as encrypted during backup and disallowing device migration. Application management 1412 agent may register in its configuration or property list file in its application archive file (e.g., Info.plist in a .ipa file for iOS application) for the agent://scheme (which can be invoked by other applications using the mobile device operating system's URL handler to transition to or launch application management agent 1412) and unique identifier com.enterprisename.agent.

Initialization of Enterprise Applications

In certain embodiments, when an end user selects a wrapped enterprise application 1414 from an enterprise application catalog presented, for example, by application management agent 1412, in order to download and install the selected enterprise application on the personal mobile device, application management agent 1412 may generate the following shared secrets and communicate them to remote management server 1410 or any other enterprise-based server that performs the task of providing the selected enterprise application to personal mobile device 1404:

- A first "initial" cryptographic key (e.g., 256-bit AES key, etc.) for protecting an initial exchange between the selected enterprise application (once installed on personal mobile device 1404) and application management agent 1412.
- A second "initial" cryptographic key (e.g., 256-bit key, etc.) to use with a hash-based message authentication code (e.g., SHA256-HMAC) for protecting the integrity and providing authentication for the initial exchange between the selected enterprise application (once installed on personal mobile device 1404) and application management agent 1412 (although it should be recognized that any other hashing or MAC algorithms or technologies may be utilized in alternative embodiments).
- An "initial" suffix (e.g., 128-bit hex encoded and randomly generated, etc.) to generate a name for a specific pasteboard (e.g., using the UIPasteboard functionality in Apple iOS, etc.) for the initial exchange between the selected enterprise application and application management agent 1412. This "initial" suffix may be, for example, (i) appended to com.enterprisename to create com.enterprisename.initialSuffix as the pasteboard name for the initial exchange, and (ii) used as the URL scheme (e.g., initialSuffix://) for the selected enterprise application which can be invoked by other applications to call functionality within the selected enterprise application. These initial keys may be stored in the keychain for application management agent 1412 provided by the mobile device operating system and may also be embedded by remote management server 1410 in the application archive file (e.g., .ipa for an iOS application, etc) while remote management server 1410 is performing a wrapping process on the selected enterprise application. Similar to application management agent's 1412 registration process, as previously discussed, a wrapped enterprise application 1414 may also register in its configuration or property list file in its application archive file (e.g., Info.plist in a .ipa file for iOS application) for the initialSuffix:// scheme (which can be invoked by other applications using the mobile device operating system's URL handler to transition to or launch the application) and unique identifier com.enterprisename.appName. In certain embodiments, the above initial keys and suffix may expire after a certain period of time to further enhance security. Since the initial keys and suffix are embedded in the application archive file (e.g., .ipa file) and therefore may be extracted by malicious applications trying to impersonate the enterprise application, such embodiments time-bound the initial keys and suffix to limit the window in which such a malicious application might be able to extract them.

Once the selected enterprise application is downloaded to and installed on personal mobile device 1404, these initial keys may be used to validate the selected enterprise application to application management agent 1412. For example, when a wrapped enterprise application 1414 launches for the first time it will register with and obtain its initial security policy and credentials from application management agent 1412. In one embodiment, upon launching for the first time, in order to authenticate itself to application management agent 1412, the selected enterprise application may use the second initial cryptographic key to compute a message authentication code (MAC, using, for example the SHA256-HMAC technique) on a message (e.g., "INIT," etc.) that it writes into a pasteboard created and named by the above "initial" suffix above (e.g., com.enterprisename.initialSuffix) and then request the mobile operating system to transition to a registration process of application management agent 1412 by invoking a URL identifying application management agent 1412 (e.g., agent://register/appName). Application management agent 1412 can then invoke its registration process by accessing the MAC in the pasteboard and confirming that MAC authenticates wrapped enterprise application 1414 by using its corresponding second initial cryptographic key that was stored in the keychain of application management agent 1412. If authenticated, application management agent 1412 may then generate the following:

- a first "session" cryptographic key (e.g., 256-bit AES, etc.) protecting the confidentiality of all future communication between application management agent 1412 and wrapped enterprise application 1414.
- a second "session" cryptographic key (e.g., 256-bit key, etc.) to use with a hash-based message authentication code (e.g., SHA256-HMAC) for protecting the integrity and providing authentication for all future communication between application management agent 1412 and wrapped enterprise application 1414 (although it should be recognized that any other hashing or MAC algorithms or technologies may be utilized in alternative embodiments).
- a "session" suffix (e.g., a 128-bit hex encoded and randomly generated) to generate a name for a specific pasteboard (e.g., using the UIPasteboard functionality in Apple iOS, etc.) for implementing the communication channel. This suffix may be, for example, appended to com.enterprisename to create com.enterprisename.sessionSuffix as the name of the particular pasteboard.

In such a foregoing embodiment, generation of these session keys and session suffix provides further security since, as previously discussed, the initial keys and initial suffix, which have been stored in the .ipa file of wrapped enterprise application 1414 and can therefore be more easily accessed, are only used during an initial authentication process. It thus should be recognized that alternative embodiments may not necessarily use both initial keys/suffices and session keys/suffices, depending upon a level of enterprise security desired. Similarly, the above generation of random suffixes that may be appended to pasteboard names is also a security measure, making it more difficult to identify such pasteboards, and alternative embodiments may not necessarily implement such suffixes.

Once application management agent 1412 has authenticated wrapped enterprise application 1414, it begins the process of providing the enterprise's initial security policy and initial credentials to wrapped enterprise application 1414. For example, if P represents the initial security policy description and C represents the initial credentials, then, in one embodiment, application management agent 1412 writes the following to the com.enterprisename.initialSuffix pasteboard for wrapped enterprise application 1414:

iv—a randomly generated initialization vector for use with cryptographic algorithm (e.g., AES-CBC, although it should be recognized that alternative embodiments may utilize other cryptographic algorithms).

An encrypted message (referred to as $T_x$) comprising (1) the first session cryptographic key, (2) the second session cryptographic key, (3) the session suffix, (4) the first workspace cryptographic key, (5) the second workspace cryptographic key, (6) the workspace suffix, (7) P (initial security policy), and (8) C (initial credentials), where the message is encrypted using the AES-CBC cryptographic algorithm with iv and the first initial cryptographic key as inputs into the algorithm.

A MAC of a message comprising iv and $T_x$ using, for example, the SHA256-HMAC algorithm and the second initial cryptographic key as input into the SHA256-HMAC algorithm.

Once application management agent 1412 has written the above to wrapped enterprise application's 1414 pasteboard 1422, application management agent 1412 will transition execution flow back to a registration reply process within wrapped enterprise application 1414 itself (e.g., by requesting the mobile device operating system's URL handler to call, for example, initialSuffix://register-reply). Wrapped enterprise application 1414 can then access the com.enterprisename.initialSuffix pasteboard and validate the MAC to verify that the contents of the pasteboard originate from application management agent 1412 and have not been tampered with, and if successful, decrypt $T_x$ (e.g., using iv and the first initial cryptographic key, which wrapped enterprise application 1414 has access to in its .ipa file) and extract the security policy P to copy and store to a local file. Similarly, wrapped enterprise application 1414 may extract the credentials C from Tx and then store them as a local file (e.g., an embodiment using Apple iOS may further locally store the credentials with an attribute NSURLIsExcludedFromBackupKey set that disallows backup and placed in the NSFileProtectionComplete file protection class).

Similarly, wrapped enterprise application 1414 may extract the session keys from $T_x$ and store them in its keychain (application management agent 1412 may have stored them in its own keychain when it generated them). Embodiments may store these session keys with particular attributes, for example, the kSecAttrAccessibleWhenUnlockedThisDeviceOnly attribute in an Apple iOS embodiment. Similarly, wrapped enterprise application 1414 may extract the workspace keys from Tx and place them in its keychain. In certain embodiments, an additional attribute, seq_appName (e.g., a sequence number) may be initialized to zero and placed in a persistent plist by both wrapped enterprise application 1414 and application management agent 1412. Such a sequence number can be used to prevent replay attacks during policy and credential updates as further discussed below.

It should be recognized that while the above process was performed by utilizing the mobile device operating system's URL handler to transition execution flow between wrapped enterprise application 1414 and application management agent 1412, alternative embodiments may utilize multitasking support that is available in the mobile device operating system. In one such embodiment, for example, application management agent 1412 may execute in the background for a period of time (e.g., 10-20 minutes, etc.) and be able to respond to registration requests by registering for pasteboard notifications on com.enterprisename.initialSuffix for particular wrapped enterprise applications 1414.

Updating Enterprise Application Policies and Credentials

As previously discussed, security policies and credentials provided by remote management server 1410 to application management agent 1412 may have a lease period associated with them. In such cases, wrapped enterprise applications 1414 may require updates periodically of such data. A wrapped enterprise application 1414 may also regularly transition to application management agent 1412 to request services such as PIN unlock.

In one embodiment, upon expiration of a lease period, wrapped enterprise application 1414 first generates a request R for application management agent 1412 in order to obtain updates to the security policy and/or credentials. Wrapped enterprise application 1414 then writes this request onto its com.enterprisename.sessionSuffix pasteboard as follows:

iv—a randomly generated initialization vector for use with cryptographic algorithm (e.g., AES-CBC, although it should be recognized that alternative embodiments may utilize other cryptographic algorithms).

An encrypted message (referred to as $T_x$) comprising (1) seq_appName+1 (if it exists in the embodiment), and (2) the request R. where the message is encrypted using the AES-CBC cryptographic algorithm with iv and the first session cryptographic key as inputs into the algorithm.

A MAC of a message comprising iv and $T_x$ using, for example, the SHA256-HMAC algorithm and the second session cryptographic key as input into the SHA256-HMAC algorithm.

Wrapped enterprise application 1414 then transitions execution flow to a "send" process in application management agent 1412 by invoking the mobile device operating system's URL handler with agent://send/appName. Application management agent 1412 takes over execution flow and accesses the com.enterprisename.sessionSuffix pasteboard to validate the MAC to verify that the contents of the pasteboard originate from wrapped enterprise application 1414 and have not been tampered with. If verified, application management agent 1412 decrypts $T_x$ and checks whether seq_appName+1 matches its own value for the next sequence number (and, if so, update and increments its own version of seq_appName accordingly). Application management agent 1412 can then extract the request R and respond with any corresponding updated security policies and/or credentials. For example, in one embodiment, if P represents the new security policy description and C represents the new credentials that should be provided to wrapped enterprise application 1414, then application management agent 1412 writes the following items in the com.enterprisename.sessionSuffix pasteboard:

iv—a randomly generated initialization vector for use with cryptographic algorithm (e.g., AES-CBC, although it should be recognized that alternative embodiments may utilize other cryptographic algorithms).

An encrypted message (referred to as $T_x$) comprising (1) seq_appName+1 (if it exists in the embodiment), (2) the new security policy description P, and (3) the new credentials C, where the message is encrypted using the AES-CBC cryptographic algorithm with iv and the first session cryptographic key as inputs into the algorithm.

A MAC of a message comprising iv and $T_x$ using, for example, the SHA256-HMAC algorithm and the second session cryptographic key as input into the SHA256-HMAC algorithm.

Application management agent 1412 can then transition execution flow back to a "send" process within wrapped enterprise application 1414 by requesting the URL handler to invoke, for example, initialSuffix://send where initialSuffix is the initial suffix first generated for wrapped enterprise application 1414 during its initialization process, as previously discussed. After wrapped enterprise application 1414 is able to validate the MAC, it decrypts the message the message, extracts seq_appName+1 to confirm the sequence number of the message, and then extracts and applies the new security policy P and credentials C if successful as above.

In certain embodiments, application management agent 1412 may utilize push update mechanisms provided by the mobile device operating system in order to impose new security policies or credentials prior to lease expiration and obtain acknowledgement from the wrapped enterprise application 1414 that it has accordingly applied the new policies and credential accordingly. For example, in one embodiment, application management agent 1412 posts the new security policy P and/or credentials C to wrapped enterprise application's 1414 pasteboard with the same message format as used in a "pull" request above (i.e., where wrapped enterprise application 1414 initiates the request for the new security policies and credentials, rather than application management agent 1412 "pushing" the new security policies and credentials to wrapped enterprise application 1414). Application management application 1412 can then initiate the execution of an "acknowledgement" process within wrapped enterprise application 1414 by requesting the URL handler to invoke, for example, initialSuffix://send-ack. Wrapped enterprise application 1414 takes over execution flow, validates and decrypts the message, updates the sequence number as previously described, updates its local files to contain the new security policy P and credentials C and then writes the following to wrapped enterprise application's 1414 pasteboard (e.g., com.enterprisename.sessionSuffix) to acknowledge receipt of the new security policy P and credentials C:

A MAC of a message comprising an acknowledgement value ("ACK") and an incremented sequence number seq_appName+1 using, for example, the SHA256-HMAC algorithm and the second session cryptographic key as input into the SHA256-HMAC algorithm.

Wrapped enterprise application 1414 can then transition execution flow back to an "acknowledgment" execution flow in application management agent 1412 by requesting the URL handler to invoke, for example, agent://ack/appName. Upon validating the MAC, application management agent 1412 can then confirm that the pushed security policy and credentials were received by wrapped enterprise application 1414. It should be recognized that alternative embodiments may push new polices and credentials to wrapped enterprise applications 1414 in alternative manners, for example, placing the new policies and credentials on pasteboard 1422 and having wrapped enterprise application 1414 receive them on a pasteboard change notification (rather than invoking the URL handler).

Sharing Workspace Settings Across Enterprise Applications

As previously discussed, wrapped enterprise applications 1414 may also share settings with each other. For example, one such shared setting may be a PIN lock status (or similar authentication lock mechanism). When unlocked, the unlock status may be valid until a certain period of inactivity. If any particular wrapped enterprise application 1414 is being utilized by the end user, then wrapped enterprise application 1414 should extend or update the unlock status to avoid any indication by an un-updated unlock status that a period of inactivity has expired.

In one embodiment, such shared settings may be time-bounded key-value associations. For example, a key $k_s$ is associated with a value $v_s$ from the time the key-value is set until some later expiration time $t_s$. During the period until expiration, any wrapped enterprise application 1414 reading the key $k_s$ will either observe $v_s$ or a "nil" value. After expiration time $t_s$ only a "nil" value will be observed, unless a new setting is made. Overlapping settings for $k_s$ are only valid when the value of $v_s$ agrees. With respect to a PIN lock status, for example, when unlocked, the unlock status (e.g., $k_s$) may be valid (e.g., $v_s$) until after a certain period of inactivity T. If a first wrapped enterprise application 1414-1 is launched by the end user, which results in the startup of the workspace, the time value for the unlock status, $t_s$ will be set to $t_{now}$+T. As wrapped enterprise application 1414-1 continues to be used by the end user, or the end user utilizes other wrapped enterprise applications 1414-2 through 1414-M, wrapped enterprise applications 1414-2 through 1414-M may periodically extend the unlock status setting by updating $t_s$ to $t_{now}$+T.

In one embodiment, shared settings are stored in pasteboard 1422 named com.enterprisename.workspace.workspaceSuffix (generated during initialization of the workspace as previously discussed). In order to update a shared setting $k_s$ such as an unlock status, a wrapped enterprise application 1414 places the following items in pasteboard 1422 for $k_s$:

iv—a randomly generated initialization vector for use with cryptographic algorithm (e.g., AES-CBC, although it should be recognized that alternative embodiments may utilize other cryptographic algorithms).

An encrypted message (referred to as $T_w$) comprising (1) a value $v_s$ (for example, to extend the PIN lock status, it may be the same "valid" value), and (2) a time value $t_s$ (for example, to extend the PIN lock status, it may be $t_{now}$+T), where the message is encrypted using the AES-CBC cryptographic algorithm with iv and the first workspace cryptographic key as inputs into the algorithm.

A MAC of a message comprising iv and $T_w$ using, for example, the SHA256-HMAC algorithm and the second workspace cryptographic key as input into the SHA256-HMAC algorithm.

Wrapped enterprise application 1414 reads a shared setting $k_s$ by examining the entry for $k_s$ in the com.enterprisename.workspace.workspaceSuffix pasteboard, validating the MAC and then decrypting the message and validating that $t_s > t_{now}$.

Shared Workspace Pasteboard Access

Certain embodiments herein also "virtualize" the pasteboards offered by the mobile device operating system specifically for wrapped enterprise applications 1414. For example, when a wrapped enterprise application 1414 supports access or updates to the mobile device operating systems standard "general" or "find" pasteboards or creates or uses an application specific pasteboard (e.g., as created by the enterprise application itself), the wrapping of the enterprise applications revises the names of those pasteboards to particular workplace accepted pasteboards named com.enterprisename.pasteboard.workplaceSuffix.T, where T is either general, find or some application specific name. Setting a value $v_p$ in a particular pasteboard T for pasteboard type $k_p$ involves updating $k_p$ in com.enterprisename.pasteboard.workspaceSuffix.T with:

iv—a randomly generated initialization vector for use with cryptographic algorithm (e.g., AES-CBC, although it should be recognized that alternative embodiments may utilize other cryptographic algorithms).

An encrypted message (referred to as $T_p$) comprising a value $v_p$, where the message is encrypted using the AES-CBC cryptographic algorithm with iv and the first workspace cryptographic key as inputs into the algorithm.

A MAC of a message comprising iv and $T_p$ using, for example, the SHA256-HMAC algorithm and the second workspace cryptographic key as input into the SHA256-HMAC algorithm.

File Handling

Embodiments may also secure locally stored files 1420 that are created or accessed by wrapped enterprise applications 1414 in the workspace such that these files cannot be accessed by non-workspace applications. For example, in one embodiment, file URL handling may be hooked and a replacement handler will ensure that only workspace applications appear in a list of handlers that an end user can select (such a list may be, for example, maintained as a shared setting in the com.enterprisename.workspace.workspaceSuffix pasteboard with application management agent 1412). Alternatively, wrapped enterprise applications 1414, when storing local files 1420 in a public area of the file system of mobile device 1404, may encrypt such files using the workspace keys such that only other wrapped enterprise applications 1414 in the workspace with access to such keys can subsequently access such files.

Support for Different Types of Enterprise Applications

Certain embodiments herein may also provide capabilities for third party developed applications, for example, offered via a traditional application store (e.g., App Store by Apple, in contrast to an enterprise application catalog provided by application management agent 1412) to be part of an enterprise's workspace. Since the configuration or property list file in such third party application archive files (e.g., Info.plist in a .ipa file for iOS) are public, the initial keys and suffix that are used to authenticate a wrapped enterprise application 1414 to application management agent 1412 cannot be inserted into such application archive files as previously discussed (as could be done when application management agent 1412 communicated with remote management server 1410 at enterprise 1402 that delivered wrapped enterprise application 1414 to mobile device 1404).

In one such embodiment, third party developers may develop applications to conform to a provided API or SDK that conforms to the security mechanisms described herein in order to join a workspace. In addition, such embodiments may further (i) provide the enterprise a capability to "whitelist" third party applications that should be allowed to join the enterprise workspace, and (2) present a visual request to the end user for explicit authorization of any such third party application in order to join the workspace.

In one such embodiment, a push mechanism (such as Apple's APNS) can be used by application management agent 1412 to validate a whitelisted third party application for joining an enterprise workspace. For example, the third party developer may generate an authentication certificate (SSL) to authenticate the third party developer to an enterprise's remote management server 1410 during registration of the third party application with the workspace on the end user's personal mobile device 1404. The third party developer then submits its application to enterprise 1402 (or to a service provider of enterprise 1402 that assists the enterprise in managing third party applications for the enterprise's workspace) which validates that the application properly utilizes the SDK and is not actively subverting the workspace. If validated, enterprise 1402 (or its service provider) adds the third party application and associated public authentication certificate (for authentication with the enterprise's remote management server 1410) to a public whitelist. The third party then generates a provisioning profile and linked authentication certificates (e.g., SSL) for the push mechanism (e.g., APNS, etc.) and places the signed third party application in a public mobile application store (e.g., Apple's App Store, etc.).

Figure 15:
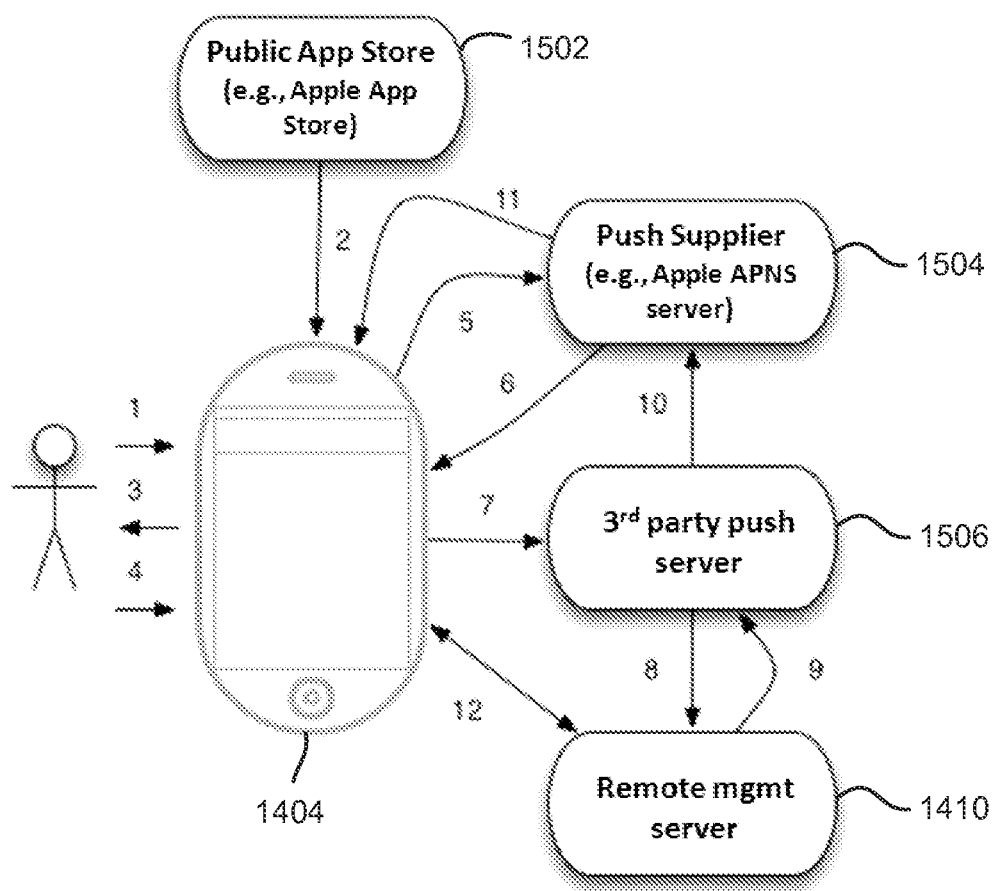
FIG. 15 illustrates a method of installing a third party application on a personal mobile device.

FIG. 15 illustrates a method of installing a third party application on a personal mobile device. As depicted in FIG. 15, when the end user selects (step 1) and downloads the third party application from the public mobile application store 1502 (step 2), upon a first launch of the third party application on the end user's mobile device 1404, the third party application registers with the mobile device operating system to receive push notifications (e.g., push notifications with registerForRemoteNotificationTypes: in one Apple iOS embodiment), which in certain embodiments may need to be expressly permitted by the end user (steps 3 and 4). In turn, the mobile device operating system may request a device token from a push mechanism supplier 1504 (e.g., Apple APNS server) (step 5). Upon receipt of the device token (e.g., in application:didRegisterForRemoteNotificationsWithDeviceToken: in one Apple iOS embodiment) (step 6), the third party application supplies the device token to the third party's push mechanism server 1506, together with the enterprise's name for its remote management server 1410 (step 7). The third party's push mechanism server contacts the enterprise's remote management server 1410 and requests an initial shared secret for the third party application/end user device combination (step 8). The previously generated authentication certificate (SSL) can be used to identify third party push mechanism server 1506 and the third party application to the enterprise's remote management server 1410. The enterprise's remote management server 1410 can then query the public whitelist and, if successful, returns the requested initial shared secret (step 9). Third party push mechanism server 1506 then connects to server 1504 of the push mechanism supplier (e.g., Apple's APNS server) with the authentication certificates (SSL) for the push mechanism and transmits the initial shared secret through the push mechanism to the third party application on mobile device 1404 (step 10). The third party application receives the initial shared secret and commences an enterprise application initialization process within the workspace, as previously discussed (step 11). When application management agent 1412 receives the registration request (e.g., "INIT" message previously discussed), it queries remote server 1410 for the initial shared secret and then continues the enterprise application initialization process as previously described, with the exception that the third party application will register for the URL handler scheme as appName:// since it is not possible to know the initial shared secrets at generation time of the application archive file (e.g., .ipa file) (step 12).

An alternative embodiment to using a push mechanism as described above is to leverage in-app purchase function that enables an end user to purchase items while running a particular application on a mobile device. For example, an end user could "purchase" the initial secrets from inside the third party application, producing a receipt. The receipt could then be sent to the enterprise's remote management serve for validation. The receipt can contain the third party application's unique identification and may be validated with the application store's servers.

Although one or more embodiments of the present invention have been described in some detail for clarity of understanding, it will be apparent that certain changes and modifications may be made within the scope of the claims. For example, while embodiments herein have referred to certain mobile operating systems such as Apple's iOS, it should be recognized that any mobile operating systems may be utilized in alternative embodiments such as Android®, Research in Motion's Blackberry® OS, Microsoft's Windows® Phone, Hewlett Packard's webOS®, Symbian®, Java®, and the like. Similarly, embodiments herein may have referred to certain functions and components using terminology more commonly used in certain mobile operating systems as compared to others. It should be recognized that use of such terminology is merely exemplary not meant to limit the scope of the teachings herein to any particular operating system and that corresponding functions and components in other operating system platforms may benefit from the teachings herein. Furthermore, it should be recognized that many of the process flows described herein may relate to embodiments that consider the functional structures, layers and limitations of current mobile operating systems and are therefore constrained the limitations of such mobile operating systems. It should be thus recognized that alternative embodiments may not be limited to current mobile operating system limitations and may implement the described techniques herein by creating an entirely new mobile operating system designed to separate personal and work environments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices (e.g., mobile phones, tablets, and other mobile devices), microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for creating a secured workspace in a mobile device, comprising:
   installing an application management agent on the mobile device, wherein the application management agent is configured to communicate with a remote server to obtain a security policy, the application management agent further providing an initial suffix, a first initial cryptographic key and a second initial cryptographic key to the remote server;
   installing a wrapped enterprise application on the mobile device, the wrapped enterprise application having code injected therein that, when executed by the mobile device, causes the mobile device to intercept at least a portion of instructions being executed by the wrapped enterprise application and to interpose alternative instructions that comply with the security policy, wherein the initial suffix, the first initial cryptographic key and the second initial cryptographic key are embedded in the wrapped enterprise application, wherein the first cryptographic key and the second cryptographic key protect an initial exchange between the wrapped enterprise application and the application management agent, the wrapped enterprise application generating a message authentication code using the second cryptographic key; and
   communicating among the wrapped enterprise application, the application management agent, and other wrapped enterprise applications through pasteboard and uniform resource locator (URL) handlers provided by an operating system of the mobile device, wherein the wrapped enterprise application writes the message authentication code and the initial suffix to a pasteboard, and the application management agent identifies initial suffix and validates the message authentication code based upon the second cryptographic key.

2. The method of claim 1, wherein the step of communicating comprises:
   encrypting messages from the wrapped enterprise application to a recipient application with keys obtained from the application management agent prior to the messages being written to a pasteboard identified by a randomized name shared with the application management agent.

3. The method of claim 2, wherein the step of communicating further comprises:
   invoking a URL for the recipient application to switch an execution flow from the wrapped enterprise application to the recipient application during an exchange of the messages, wherein the URL is a randomized URL known to the wrapped enterprise application.

4. The method of claim 1, wherein the step of communicating comprises:
   exchanging a message between the wrapped enterprise application and the application management agent using the pasteboard identified by a randomized name from an initial suffix provided by the application management agent to the remote server;
   invoking a first URL to switch from a registration process of the wrapped enterprise application to a registration process of the application management agent;
   exchanging a first encrypted message between the application management agent and the wrapped enterprise application using the pasteboard, the first encrypted message encrypted using a first initial cryptographic key; and
   invoking a second URL to switch from the registration process of the application management agent to the registration process of the wrapped enterprise application.

5. The method of claim 4, wherein the first encrypted message includes the security policy and credentials.

6. The method of claim 5, wherein the step of communicating further comprises:
   exchanging a second encrypted message between the wrapped enterprise application and the application management agent using a pasteboard identified by a randomized name from the initial suffix, the other encrypted message encrypted using a session key and including a request to update at least one of the security policy and the credentials; and
   invoking a third URL to switch from a send process of the wrapped enterprise application to a send process of the application management agent;
   exchanging a third encrypted message between the application management agent and the wrapped enterprise application using he pasteboard, the third encrypted message encrypted using the session key and including at least one of an updated security policy and updated credentials; and
   invoking a fourth URL to switch from the send process of the application management agent to the send process of the wrapped enterprise application.

7. The method of claim 4, wherein each of the message and the first encrypted message are exchanged with the message authentication code (MAC) generated using a second initial cryptographic key.

8. The method of claim 1, wherein the step of communicating further comprises:
   exchanging an encrypted message between the wrapped enterprise application and one of the other wrapped enterprise applications using a pasteboard identified by a randomized name from shared secret data provided to each of the wrapped enterprise application and the one of the other wrapped enterprise applications by the application management agent, the encrypted message encrypted using a workspace key from the shared secret data.

9. The method of claim 8, wherein the encrypted message comprises a value for a shared setting between the wrapped enterprise application and the one of the other wrapped enterprise applications.

10. The method of claim 1, wherein the code injected into the wrapped enterprise application, when executed by the mobile device, causes the mobile device to generate a virtual pasteboard from a pasteboard maintained by the operating system of the mobile device.

11. The method of claim 1, further comprising:
encrypting a local file generated by the wrapped enterprise application using a workspace key from shared secret data provided to the wrapped enterprise application by the application management agent.

12. The method of claim 1, further comprising:
installing a third party application to the mobile device;
receiving initial shared secret data for the third party application from the remote server; and
communicating messages between the third party application and the application management agent through the pasteboard and URL handlers using the at least one initial key to encrypt and authenticate the messages.

13. The method of claim 12, wherein the third party application receives the initial shared secret data from a third party push server.

14. A computing system for creating a secured workspace in a mobile device, comprising:
a storage device storing instructions;
one or more processors, coupled to the storage device, configured to execute the instructions to:
install an application management agent on the mobile device, wherein the application management agent is configured to communicate with a remote server to obtain a security policy, the application management agent further providing initial shared secret data to the remote server, the initial shared secret data comprising an initial suffix, a first initial cryptographic key and a second initial cryptographic key;
install a wrapped enterprise application to the mobile device, the wrapped enterprise application having code injected therein that, when executed by the mobile device, causes the mobile device to intercept at least a portion of instructions being executed by the wrapped enterprise application and to interpose alternative instructions that comply with the security policy, wherein the initial shared secret data is embedded in the wrapped enterprise application, and the first cryptographic key and the second cryptographic key protect an initial exchange between the wrapped enterprise application and the application management agent, the wrapped enterprise application generating a message authentication code using the second cryptographic key; and
facilitate communication between the wrapped enterprise application, the application management agent, and other wrapped enterprise applications through pasteboard and uniform resource locator (URL) handlers provided by an operating system of the mobile device, wherein the wrapped enterprise application writes the message authentication code and the initial suffix to a pasteboard, and the application management agent identifies initial suffix and validates the message authentication code based upon the second cryptographic key.

15. The computing system of claim 14, wherein the one or more processors are configured to execute the instructions to encrypt messages from the wrapped enterprise application to a recipient application with keys obtained from the application management agent prior to the messages being written to a pasteboard identified by a randomized name shared with the application management agent.

16. The computing system of claim 15, wherein the one or more processors are configured to execute the instructions to invoke a URL for the recipient application to switch an execution flow from the wrapped enterprise application to the recipient application during an exchange of the messages, wherein the URL is a randomized URL known to the wrapped enterprise application.

17. A non-transitory computer readable medium having instructions stored thereon that when executed by a processor cause the processor to perform a method for creating a secured workspace in a mobile device, comprising:
installing an application management agent on the mobile device, wherein the application management agent is configured to communicate with a remote server to obtain a security policy, the application management agent further providing initial shared secret data to the remote server, the initial shared secret data comprising an initial suffix, a first initial cryptographic key and a second initial cryptographic key;
installing a wrapped enterprise application to the mobile device, the wrapped enterprise application having code injected therein that, when executed by the mobile device, causes the mobile device to intercept at least a portion of instructions being executed by the wrapped enterprise application and to interpose alternative instructions that comply with the security policy, wherein the initial shared secret data is embedded in the wrapped enterprise application, and the first cryptographic key and the second cryptographic key protect an initial exchange between the wrapped enterprise application and the application management agent, the wrapped enterprise application generating a message authentication code using the second cryptographic key; and
communicating among the wrapped enterprise application, the application management agent, and other wrapped enterprise applications through pasteboard and uniform resource locator (URL) handlers provided by an operating system of the mobile device, wherein the wrapped enterprise application writes the message authentication code and the initial suffix to a pasteboard, and the application management agent identifies initial suffix and validates the message authentication code based upon the second cryptographic key.

18. The non-transitory computer readable medium of claim 17, wherein the step of communicating comprises:
encrypting messages from the wrapped enterprise application to a recipient application with keys obtained from the application management agent prior to the messages being written to a pasteboard identified by a randomized name shared with the application management agent.

19. The non-transitory computer readable medium of claim 18, wherein the step of communicating comprises:
invoking a URL for the recipient application to switch an execution flow from the wrapped enterprise application to the recipient application during an exchange of the messages, wherein the URL is a randomized URL known to the wrapped enterprise application.

* * * * *